(12) United States Patent
Nelson

(10) Patent No.: US 8,782,050 B2
(45) Date of Patent: *Jul. 15, 2014

(54) DATABASE AND INDEX ORGANIZATION FOR ENHANCED DOCUMENT RETRIEVAL

(75) Inventor: John M. Nelson, Bethesda, MD (US)

(73) Assignee: Nelson Information Systems, Inc., Bethesda, MD (US)

(*) Notice: Subject to any disclaimer, the term of this patent is extended or adjusted under 35 U.S.C. 154(b) by 247 days.

This patent is subject to a terminal disclaimer.

(21) Appl. No.: 13/080,074

(22) Filed: Apr. 5, 2011

(65) Prior Publication Data

US 2011/0184954 A1    Jul. 28, 2011

Related U.S. Application Data

(63) Continuation-in-part of application No. 12/471,748, filed on May 26, 2009, now Pat. No. 8,204,852, which is a continuation of application No. 11/123,162, filed on May 6, 2005, now Pat. No. 7,548,917.

(51) Int. Cl.
*G06F 17/30* (2006.01)

(52) U.S. Cl.
USPC ........................................ 707/740; 707/746

(58) Field of Classification Search
USPC ................. 707/740, 609, 667, 668, 741, 746; 711/161, 162
See application file for complete search history.

(56) References Cited

U.S. PATENT DOCUMENTS

| | | | | |
|---|---|---|---|---|
| 6,678,694 B1 * | 1/2004 | Zimmermann et al. | ...... | 707/731 |
| 7,490,092 B2 * | 2/2009 | Sibley et al. | ........................... | 1/1 |
| 7,548,917 B2 * | 6/2009 | Nelson | .................................. | 1/1 |
| 8,117,206 B2 * | 2/2012 | Sibley et al. | .................. | 707/746 |
| 8,204,852 B2 * | 6/2012 | Nelson | .......................... | 707/609 |
| 8,301,482 B2 * | 10/2012 | Reynolds et al. | ............ | 705/7.29 |
| 8,316,237 B1 * | 11/2012 | Felsher et al. | ................ | 713/171 |
| 8,527,520 B2 * | 9/2013 | Morton et al. | ................ | 707/746 |
| 2003/0217056 A1 * | 11/2003 | Allen et al. | ........................ | 707/7 |
| 2005/0108200 A1 * | 5/2005 | Meik et al. | ......................... | 707/3 |
| 2009/0125534 A1 * | 5/2009 | Morton et al. | ................ | 707/100 |
| 2012/0215560 A1 * | 8/2012 | Ofek et al. | ........................ | 705/3 |

* cited by examiner

*Primary Examiner* — Jean M Corrielus
(74) *Attorney, Agent, or Firm* — Whitham, Curtis, Christofferson & Cook, PC

(57) ABSTRACT

A customized, specialty-oriented database and index. of a subject matter area and methods for constructing and using such a database are provided. Selection and indexing of articles is done by experts in the topic with which the database is concerned. As a result, articles are indexed in a manner that allows facile, rapid retrieval of highly relevant articles with few or no false positives with much reduced database maintenance cost through frugal limitation of number of documents in the database, number of terms in a Master Index, and number of codes assigned to each document. A thesaurus allows indexing and search in accordance with terminology familiar to different anticipated groups of users (e.g. doctors, patients, nurses, technicians, and the like). Key articles collections and rapid access to documents therein are also provided. Additional classifications may be applied to articles or documents and searched as an additional search criterion such as a potential use. The context of key word(s) included in the search query can be specified from the hierarchical list of key words without requiring additional classification of articles/documents. Search results may also be filtered and/or sorted based on components included in the articles/documents.

27 Claims, 16 Drawing Sheets

A  General Systemic
B  Cardiovascular/Peripheral Vascular
C  Dermatology
D  Endocrinology
E  Ear/Nose/Throat/Mouth
F  Gastrointestinal/Abdomen
G  Geriatrics
H  Hematology
I  Immunology/Allergy
J  Infectious Disease
    JA  Infectious Diseases - Miscellaneous
    JB  Infections/Body System/Site
    JC  Bacterial Infections
    JD  Fungal (Mycotic) Infections
    JE  Parasitic Diseases
    JF  Viral Infections
K  Mental Development/Behavior/Psychiatry
L  Musculoskeletal/Collagen/Vascular
M  Neurology
N  Oncology
O  Ophthalmology

*Figure 4A*

P  Pathology/Clinical Laboratory
Q  Pharmacology
R  Public/Environmental Health
S  Radiology/Imaging Technics
T  Renal/Urology
U  Reproduction/Sexuality
V  Respiratory/Chest
W  Sports Medicine
X  Surgery
Y  Medicine
Z  Health Systems and Components
    ZA  Audit and Quality Control Systems
    ZB  Demographics, Health Delivery Systems and Health Manpower
    ZC  Economic, Finance and Insurance
    ZD  Government Organizations and Public Policy
    ZE  Information Systems, Publications and Communications
    ZF  Management and Organization
    ZG  Medical/Health Education and Certification
    ZH  Medicolegal
    ZI  Patient Concerns and Education
    ZJ  Research and Science

*Figure 4B*

B-3.1 Aortic Aneurysms
B-3.2 Dissecting Aneurysms
B-4 Arrhythmias/Heart Blocks - General (see also B-10.4b, Arrhythmias and Myocardial Infarct)
    B-4.1 Heart Blocks/Conduction Defects
    B-4.2 Cardioversion
    B-4.3 Arrhythmia, Drug Therapy
    B-4.4 Cardiac Pacing/Pacemakers (see also B-10.4b, Arrhythmias and Myocardial Infarct)
    B-4.5 Supraventricular Arrhythmias - General
        B-4.5a Sinus Node Disorders/Sick Sinus Syndrome
        B-4.5b Atrial Fibrillation
    B-4.6 Ventricular Arrhythmias - General
        B-4.6a Ventricular Tachycardia/Fibrillation
            B-4.6a-1 Defibrillation/Defibrillator Implants (see also B-18.1, Heart Arrest - Pre-hospitalization Defibrillation/Treatment)
            B-4.6a-2 Torsades de Pointes
                - Sudden Death, Cardiac - See B-18
    B-4.7 Arrhythmias Surgery/Interventions - General
        B-4.7a Arrhythmias/Catheter Ablation Therapy

*Figure 5A*

V-15.1 Alveolitis, Hypersensitivity/Pneumonitis (Extrinsic Allergic Pneumonia)
V-16 Interstitial Fibrosis/Pneumonia (DIP, Hamman-Rich)
    V-16.1 Cryptogenic/Fibrosing Alveolitis (Idiopathic Pulmonary Fibrosis/Bronchiolitis Obliterans)
V-17 Mediastinum/Mediastinal Disorders
V-18 Pleutal Effusions (see also T-15.1d, Kidney Failure, Chronic-Pericardial/Pleural Diseases; B-9, Congestive Heart Failure)
V-19 Pneumothorax/Hemothorax
V-20 Pulmonary Embolism - General
    V-20.1 Pulmonary Embolism, Diagnosis/Manifestations
        - Pulmonary Embolism, Prevention - See B-22.2
    V-20.2 Pulmonary Embolism, Treatment
    V-20.3 Pulmonary (Non-clot) Embolism (see also A-36, Systemic Non-clot Emboli)
        - Fat Embolism - See A-16
        - Septic Embolism - See JB-14.4c
        - Systemic Non-clot Emboli) - See A-36
    V-20.4 Pulmonary Embolism, Prevention (see also B-22.2, Venous Thrombosis/Thrombphlebitis, Prevention/Prophylaxis)
    V-20.5 Pulmonary Embolism, Risk Factors
V-21 Pulmonary Nodules
V-22 Respiratory Failures/Obstruction - General
    V-22.1 Assisted Ventilation - General

*Figure 5B*

*Untitled - Microsoft Internet Explorer*

File Edit View Favorites Tools Help

Address:

| Getting Started | Search | Manage Account | Resources | My Dashboard | Manage Folders | Recent Articles |

Browse Medical Journals by Topic

Find articles in evidence-based, peer-reviewed medical journals by browsing the topics below. You can also search by keyword, topic, specialty and other parameter.

| Search | Browse |

- [More +] Cardiovascular/peripheral Vascular - General (10,904)
- [More +] Dermatology - General (277)
- [More +] Ear/nose/throat/mouth - General (114)
- [More +] Endocrinology/metabolic Disorders - General (1,364)
- [More +] Gastrointestinal/abdomen - General (1,497)
- [More +] General Systemic (5,382)
- [More +] Geriatrics - General (908)
- [More +] Health Systems and Components - General (19,895)
- [More +] Hematology - General (non-neoplastic Disorders)(1,090)
- [More +] Immunology/allergy - General (1,190)
- [More +] Infectious Diseases - General (6,155)
- [More +] Medicine - General (3,293)
- [More +] Mental Health, Development/behavior/psychiatry - General (1,810)
- [More +] Musculoskeletal/collagen/vascular - General (1,309)
- [More +] Neurology - General (2,211)
- [More +] Oncology - General (3,244)

DATABASE AND INDEX ORGANIZATION FOR ENHANCED DOCUMENT RETRIEVAL

CROSS-REFERENCE TO RELATED APPLICATIONS

This application is a continuation-in-part of U.S. patent application Ser. No. 12/471,748, filed May 26, 2009, which issued as U.S. Pat. No. 8,204,852 on Jun. 19, 2012, which is a continuation of U.S. patent application Ser. No. 11/123,162, filed May 6, 2005 and which issued as U.S. Pat. No. 7,548,917 on Jun. 6, 2009; both of which applications are fully incorporated by reference herein and the priority of the filing date of both of which as to subject matter common to those applications is hereby claimed.

BACKGROUND OF THE INVENTION

1. Field of the Invention

The invention generally relates to a customized, specialty-oriented database and index of a subject matter area, and methods for constructing and using such a database and index. In particular, the invention provides a customized, specialty-oriented database in which articles are selected and indexed by experts in the topic with which the database is concerned, in a manner that allows the database to respond to queries as an expert system; providing facile, rapid retrieval of highly relevant articles with few or no false positives.

2. Background of the Invention

The ability to search and retrieve information electronically is a cornerstone of the "Information Age". This ability allows large segments of the population to rapidly access vast amounts of information, with clear benefits for many diverse endeavors.

In particular, for professions that rely heavily on published material as a source of current information (e.g. health and science professionals), the ability to electronically search a large database for current, up-to-date information on topics of interest has been a great boon. For example, health professionals have access to databases such as MEDLINE, which was established by the National Library of Medicine in order to facilitate the dissemination of information to the health care and scientific communities. MEDLINE is currently considered to be the "gold standard" for a periodical bibliographic database and virtually all services link to MEDLINE.

However, because the present knowledge-based society is continually producing published documents at an extremely rapid rate, databases have become repositories of stunningly vast collections of published information. For example, as of this writing, MEDLINE contains in excess of 15 million articles that are accessible via search engines such as PubMed, and is growing daily. While access to this vast repository of information is in some ways advantageous, serious problems arise when an individual attempts to electronically search this database for materials truly relevant to a specific topic of interest. It is not unusual for a MEDLINE search, no matter how well crafted, to result in the return of several tens of thousands of "hits" that correspond to the designated parameters, yet many of which are not relevant. The potential for this problem was recognized as early as 1948, when Claude Shannon of Bell Labs stated: "Classic informatics theory shows that as information increases, the amount of irrelevant and inaccurate information (often referred to as "noise") increases." Even to a highly skilled individual, scrolling through a list of several thousand articles in order to identify those that are truly apposite is a daunting, extremely frustrating and impractical task. Finessing search parameters is time-consuming, and frequently still results in a very large number (many hundreds or several thousands) of returned or retrievable documents. Yet, adding search terms to reduce the number of hits may inadvertently cause exclusion of desired information.

The retrieval of such a large number of documents per search when accessing a large database is in large part due to the classification procedure used by such services, which fail to distinguish between the most relevant articles, and those which include only ancillary references to the topic of interest (e.g. in a book or product review, or a minor section of a lengthy paper or review article, etc.). This is due in part to the large initial pool of journals (and other) sources of the indexed articles, the very large number of articles that are indexed (relatively indiscriminately) from those sources, the large number of "MeSH" (Medical subject heading) terms that are used to index the individual articles, and the large number of codes that are assigned to each article. For example, MEDLINE currently has in excess of ~15 million indexed articles drawn from ~4600 journals. About 30 codes are typically assigned to each article, and about 22,000 Mesh terms are utilized in the database. Given that MEDLINE was designed for the academic and research community, the need for completeness and sensitivity, rather than efficiency and relevance, was paramount in its design.

This is not the case for medical clinicians, for whom specificity, relevance, and efficiency are of greater concern. The return of a large number of documents from a search can thus be a particular problem in the practice of medicine today, which requires speed in obtaining current, up-to-date information on specific topics. In particular, physicians are typically in need of literature concerned with the diagnosis and treatment of specific diseases. Physicians are paid by HMOs based on the number of patients they see, not the time spent with each patient, and information gathering activity (or access to the clinical literature) is not reimbursed by third party carriers. Thus, minimization of total retrieval time of relevant, up-to-date information (which includes realizing the need for information, accessing a search engine, picking search terms, doing the search, and retrieving and assimilating the search results) is a vital issue, as this activity is likely to be confined to short breaks between seeing patients during the course of the day. Therefore, time is of the essence in retrieving and applying information from relevant articles.

Physicians are also concerned with the potential for malpractice claims. Rapid access to current, relevant information may help to avoid or to mount a defense against such claims. In addition, Board Certified Specialists must meet a minimum number of Continuing Medical Education (CME) credits annually and must pass Board Certification exams every 5-7 years, depending on the specialty. Failure to qualify may result in removal from HMO listings and a significant loss of compensation. In addition, a minimum number of CME credits is required to maintain state medical licenses. Frequently, peer-reviewed journal articles directed to a specialized topic are the basis of these exams and are thus helpful during preparation for exams.

Another issue facing general practitioners is the requirement that they function beyond the level of a generalist. Physicians are encouraged or mandated by HMOs to handle more complex cases rather than refer them to a specialist. This enables the physician to increase his/her personal income and to reduce the HMO costs by avoiding referral to a specialized expert. Other current issues for physicians include their desire to keep patients satisfied. Patients have an ever-growing access to medical information on the Internet, but no way to evaluate its validity or relevance. Less relevant or possibly invalid information may cause inappropriate or even harmful action to be taken. Studies show that patients would prefer to receive this information directly from their personal physicians, whom they trust. However, no source for rapid retrieval of only highly relevant information currently exists for physicians or their patients.

For example, of the over 100 million people who used the Internet in 2003, 75% of these individuals sought reliable medical information. Ninety percent of physicians now access the Internet and 71% expect to increase their use in the future. However, neither physicians nor patients are satisfied with current on-line sources of medical information. Patients do not trust the validity of medical information on many Web sites, and doctors want higher quality access to more relevant journal articles for faster, more confident medical decision making.

The prior art has thus-far failed to provide an electronically accessible database that is developed by seriously taking into account the relevance and appropriateness of an article for inclusion in the database, particularly in regard to multiple anticipated groups of users, and for its facile and reliable retrieval by the user. Such a database should permit rapid retrieval of a manageable number of highly relevant documents per inquiry, and eliminate articles that are marginally relevant to the topic of interest, or to the doctor's specialty. However, no system meeting these criterion has previously been developed.

SUMMARY OF THE INVENTION

The present invention provides a specialty-oriented, customized database containing current, authoritative and highly relevant information about a topic of interest that can be rapidly retrieved by the user in a straightforward manner. The customized database is organized according to specialized indices that are developed by experts in the topic of interest. The database is organized in a manner that allows the retrieval of a manageable amount of highly relevant information with few or no false positives. In a preferred embodiment, the database is electronic in nature and information in the database is retrieved electronically.

According to the invention, a core group of a limited number of sources of information is identified by experts, and information from the core sources is indexed by experts using a limited number of terms from a hierarchal (i.e. tree structure) master index. The use of experts to select information eliminates the inclusion of information that is of doubtful or marginal reliability or relevance to a particular specialty. The use of experts to index information using a limited number of index terms means that a manageable amount of only highly relevant information is retrieved by searching the database. Due to the frugal manner in which information is selected and indexed, few or no false positive results are obtained in response to database queries.

The present invention provides a method of sorting a plurality of documents to be accessed by a plurality of readers or groups of readers. The method comprises the steps of: developing a list of interest areas represented by said plurality of readers; developing a hierarchical index of subject matter referred to in said plurality of documents, each entry in said hierarchical index having at least one of an index term and an associated code; assigning a limited number of index terms and associated codes of said hierarchical index to each document of said plurality of documents, assigning at least one of said interest areas to each document of said plurality of documents; and assembling a plurality of hierarchical indices of subject matter for respective interest areas from index terms and associated codes assigned to documents in each of said interest areas; and sorting respective documents of said plurality of documents in accordance with a respective one of said plurality of hierarchical indices for respective interest areas, and, optionally, intended uses for which the article or document may be classified as particularly appropriate. As perfecting features of the invention index terms may be additionally searched as a context for an index term specified in the search query and the results of a search may be sorted by components of the article as found in the article or document text or corresponding metadata, In one embodiment of the invention, the method is employed to construct a database. In other embodiments, the interest areas are in the field of health care, and may be, for example, recognized medical specialties.

In a preferred embodiment of the invention, from 1 to about 5 index terms and associated codes are assigned per document, and the codes are applied to entries in the hierarchical index, the codes relating to subject matter of respective entries.

Yet other embodiments of the invention may further comprise steps of: designating a document as a key article; providing text related to a document; designating a document for access by a particular group of users of said database; and providing text and continuing professional education material (e.g. questions and answers) related to a document.

The invention further provides a method of generating a plurality of specialty-oriented document databases or indices from a master index of a subject matter area. The method comprises the steps of: assigning one or more specialties to each document; assigning one or more terms or codes from said master index to each document; and assembling respective databases comprising said documents or respective indices comprising said terms or codes corresponding to documents terms or codes assigned to articles which are also assigned to respective specialties. In some embodiments of the invention, the documents are limited to documents from selected sources, which may in turn be limited to core journals. In other embodiments, the selected sources are limited to core journals and secondary journals.

In a preferred embodiment of the invention, the documents are limited in number. In addition, the number of terms or codes in the master index may be limited in number.

In some embodiments of the invention, the terms in the master index are empirically derived based on occurrences in the documents. In other embodiments, the terms in the master list may contain combinations of terms based on relation of subject matter, which may be of a from suited to anticipated groups of users (e.g. professional, lay, technical, etc.).

In preferred embodiments of the invention, the terms or codes assigned to each document are limited in number. Further, the documents themselves may be limited in number.

The step of assignment of one or more specialties may be performed by designation by an expert in the subject matter area. In addition, the method may include the farther step of assigning a document type to each document.

In preferred embodiments of the invention, the terms in each of said plurality of databases or indices are the same as terms in the master index.

In some embodiments of the invention, the specialty-oriented document databases or indices are suitable for use by lay persons.

The invention further provides a method of searching a specialty oriented document database or index created from a master index of a subject matter area by: assigning one or more specialties to each document; assigning one or more terms or codes from said master index to each document; and assembling a database comprising said documents having a selected specialty in accordance with said terms or codes. The method comprises steps of arranging said terms or codes hierarchically or alphanumerically; browsing said terms or codes; and accessing said database in accordance with at least one of said terms or codes. In some embodiments, the method further comprises steps of: assigning key words to related terms or codes, respectively; browsing said keywords; and accessing said terms or code using said key words.

In all embodiments of the method, documents may be limited in number, and the method may include the further step of linking the database to a plenary database in accordance with the terms or codes.

B, Schematic diagram of document retrieval using the present invention compared to a known database.

Figure 2:
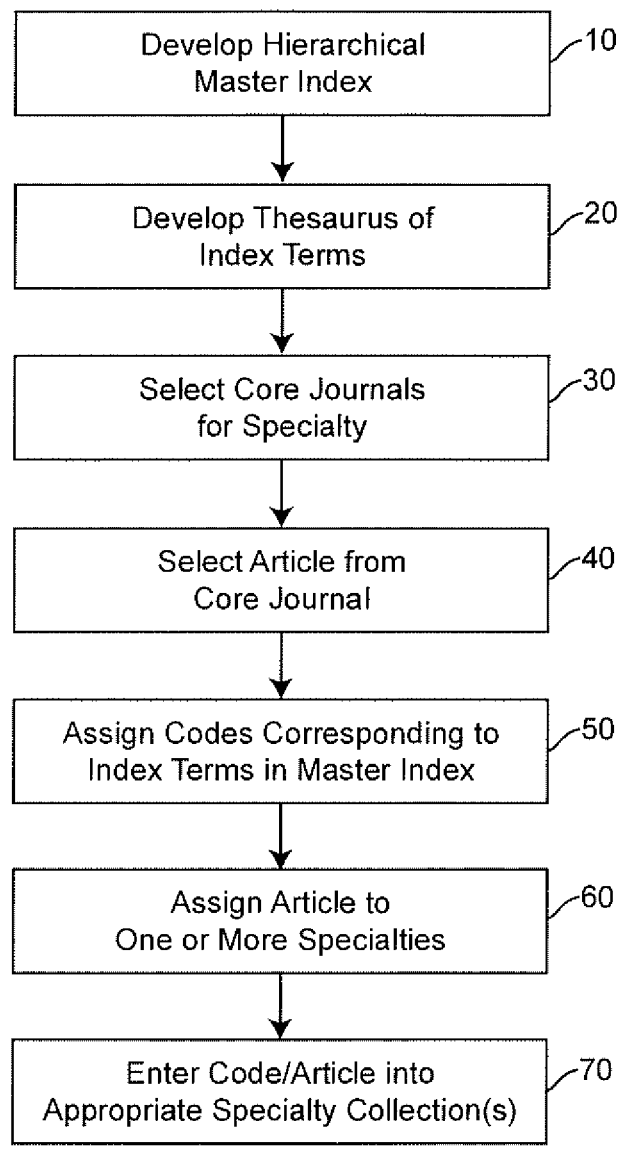

FIG. 2. Generalized flow chart showing development of a hierarchal index and coding of article.

Figure 3:
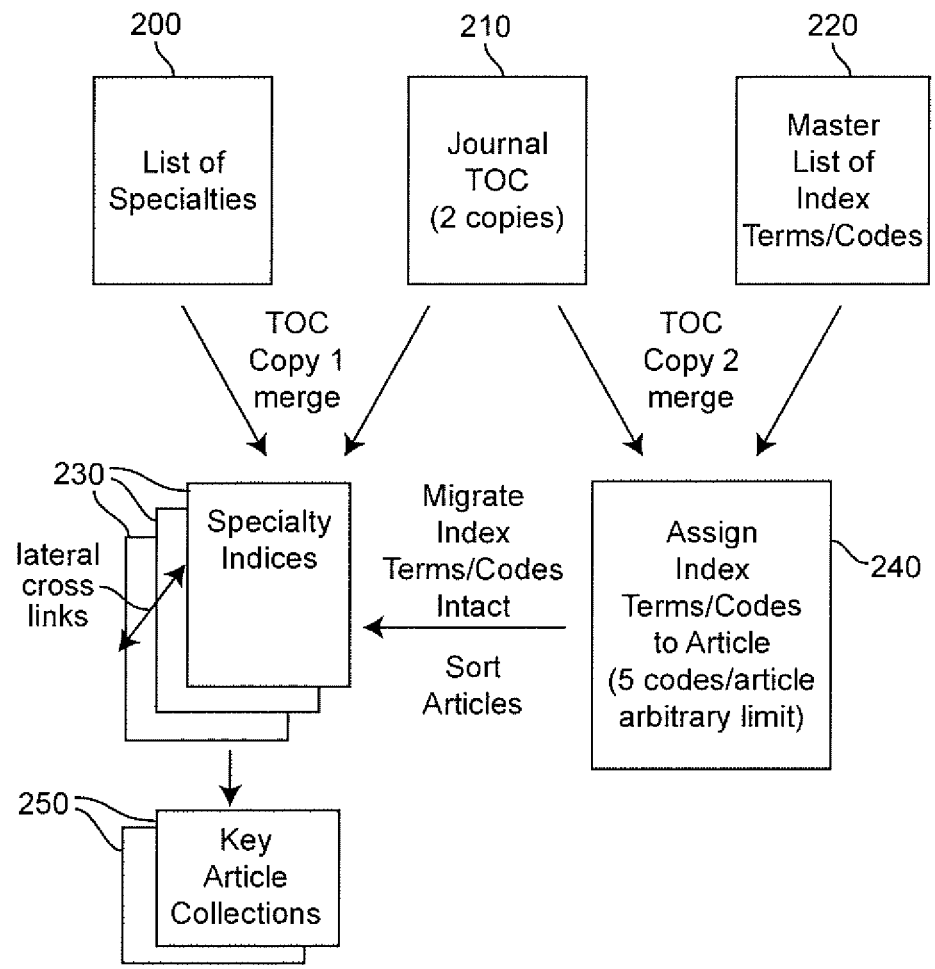

FIG. 3. Schematic representation of the method of the present invention.

FIGS. 4A and B. Depiction of general heading and sub-headings of an exemplary Master Index.

FIGS. 5A and B. Depiction of detailed heading/subheadings in an exemplary Master Index.

Figure 6:
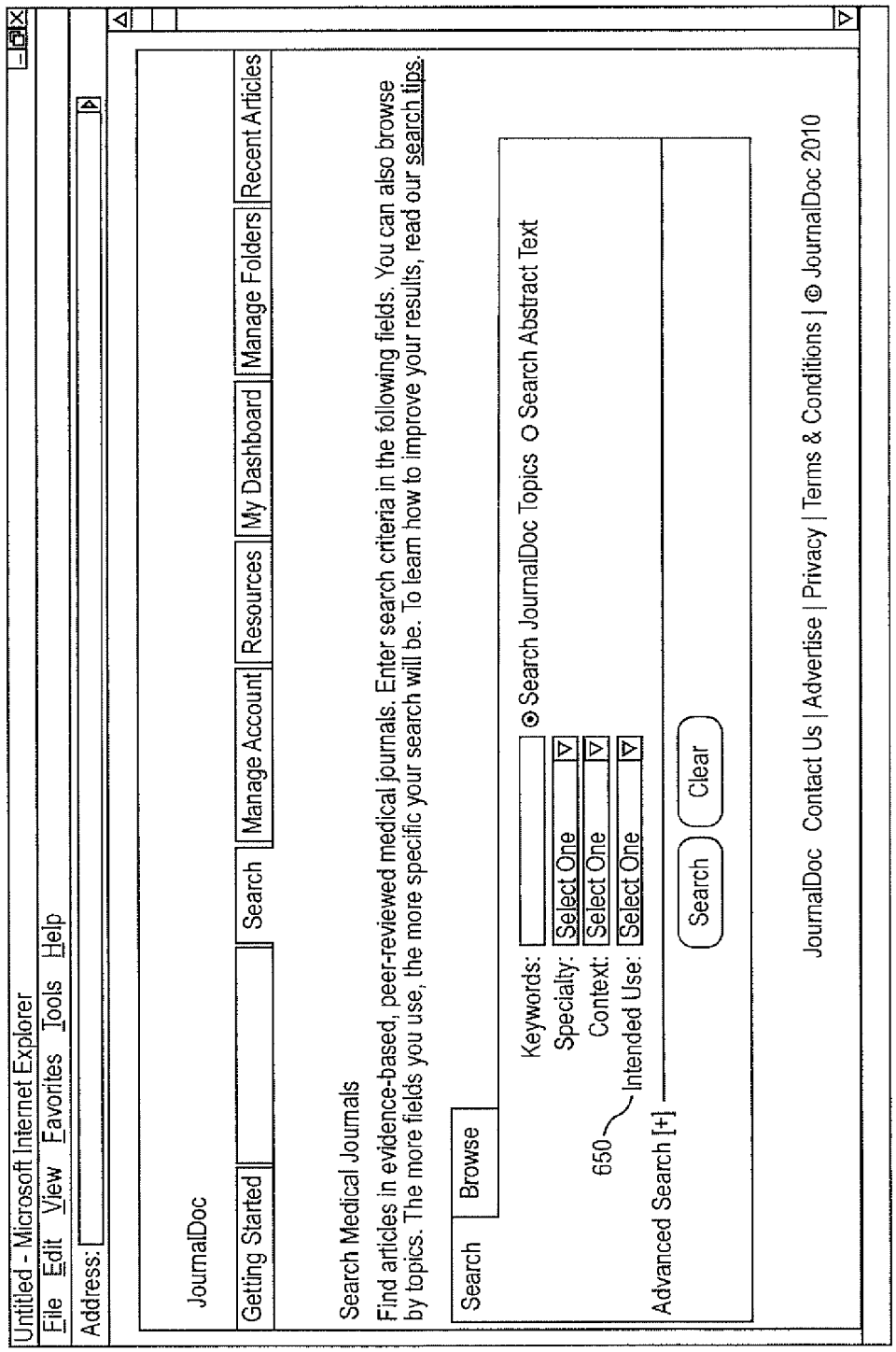
Figure 6A:
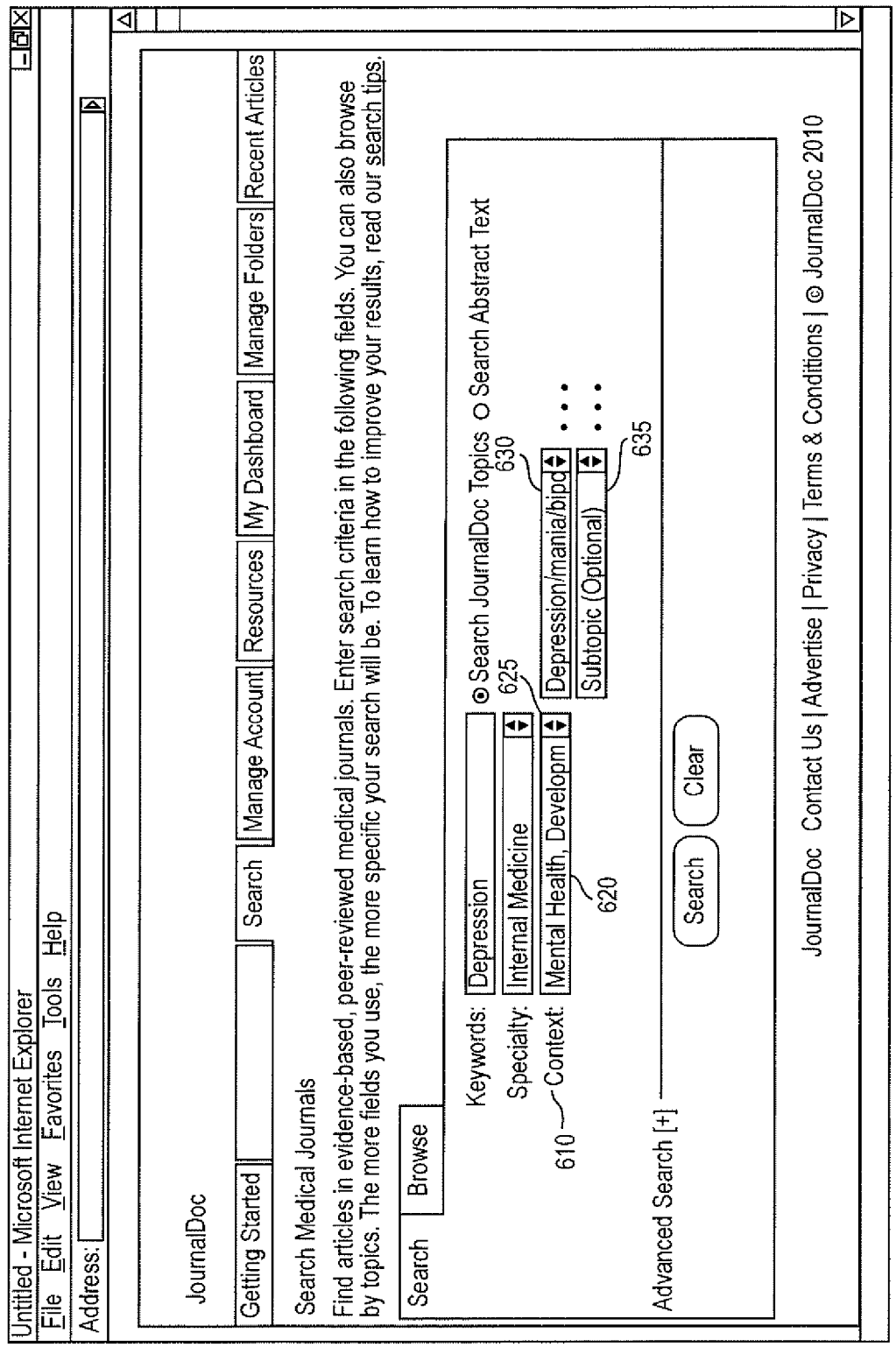
Figure 6B:
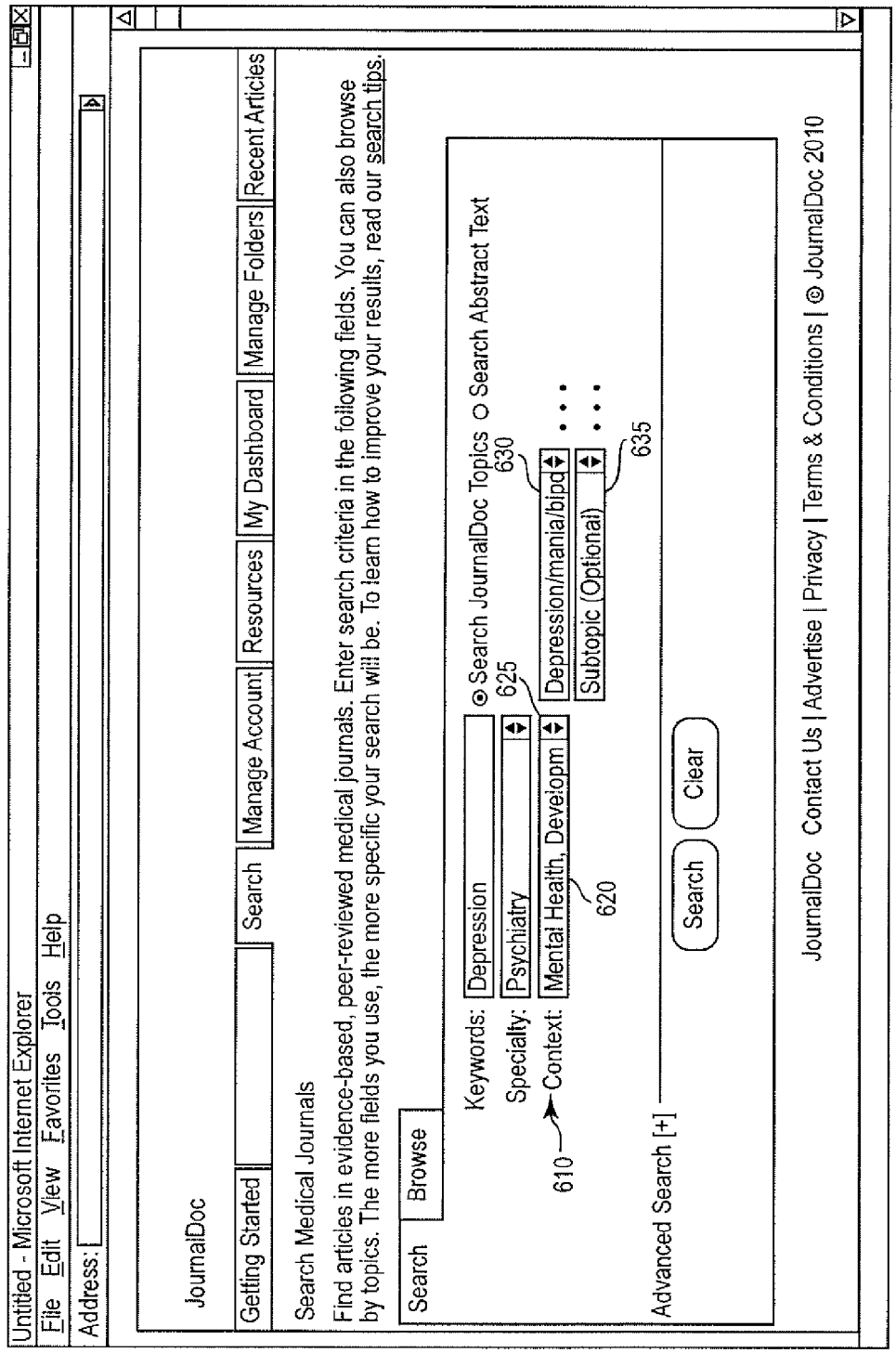
Figure 6C:
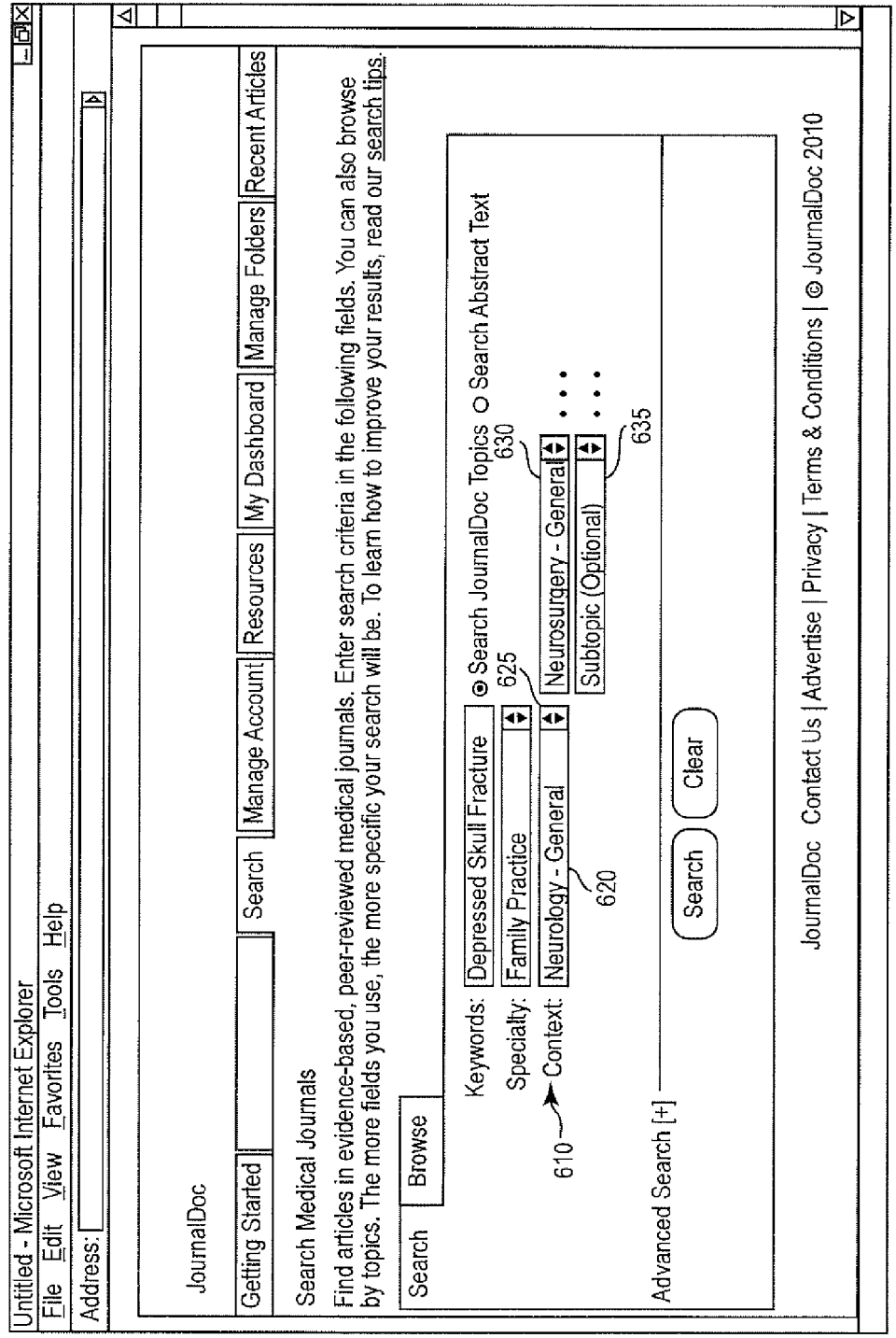

FIG. 6 is a depiction of a preferred home screen suitable for practice of the invention, FIGS. 6A, 6B and 6C are screen images of an interface display illustrating the specification of context for the key word of a search query.

Figure 8:
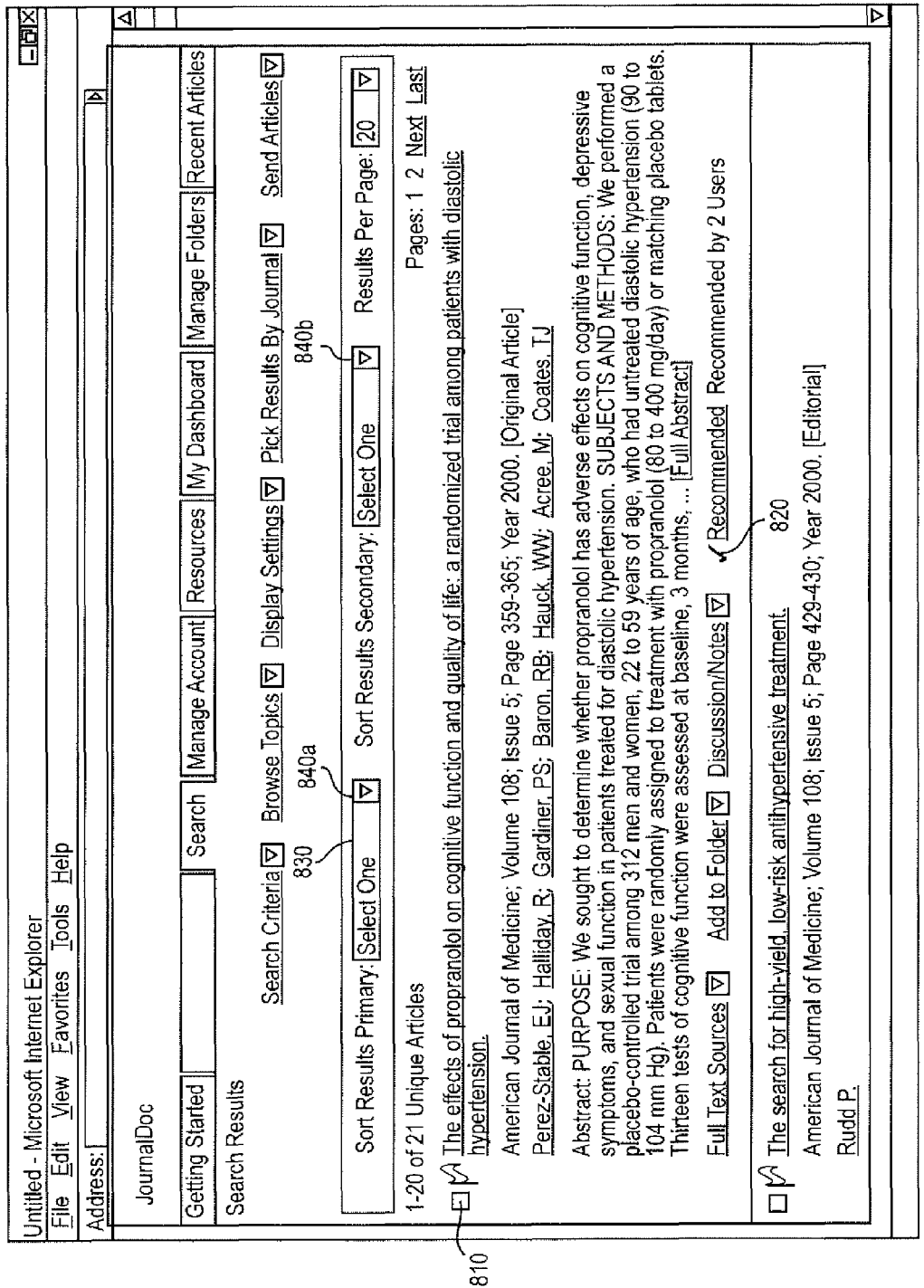
Figure 9:
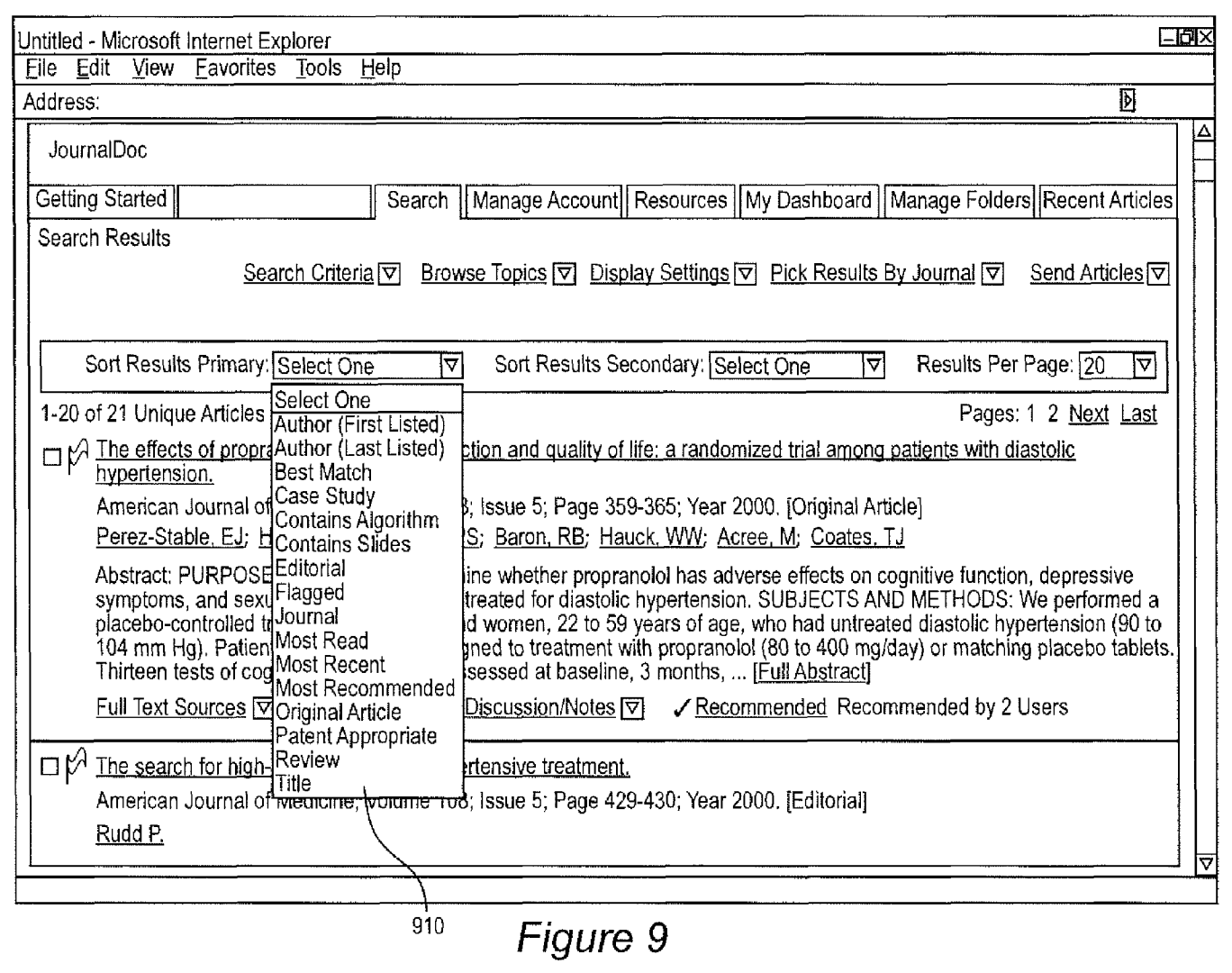
Figure 10:
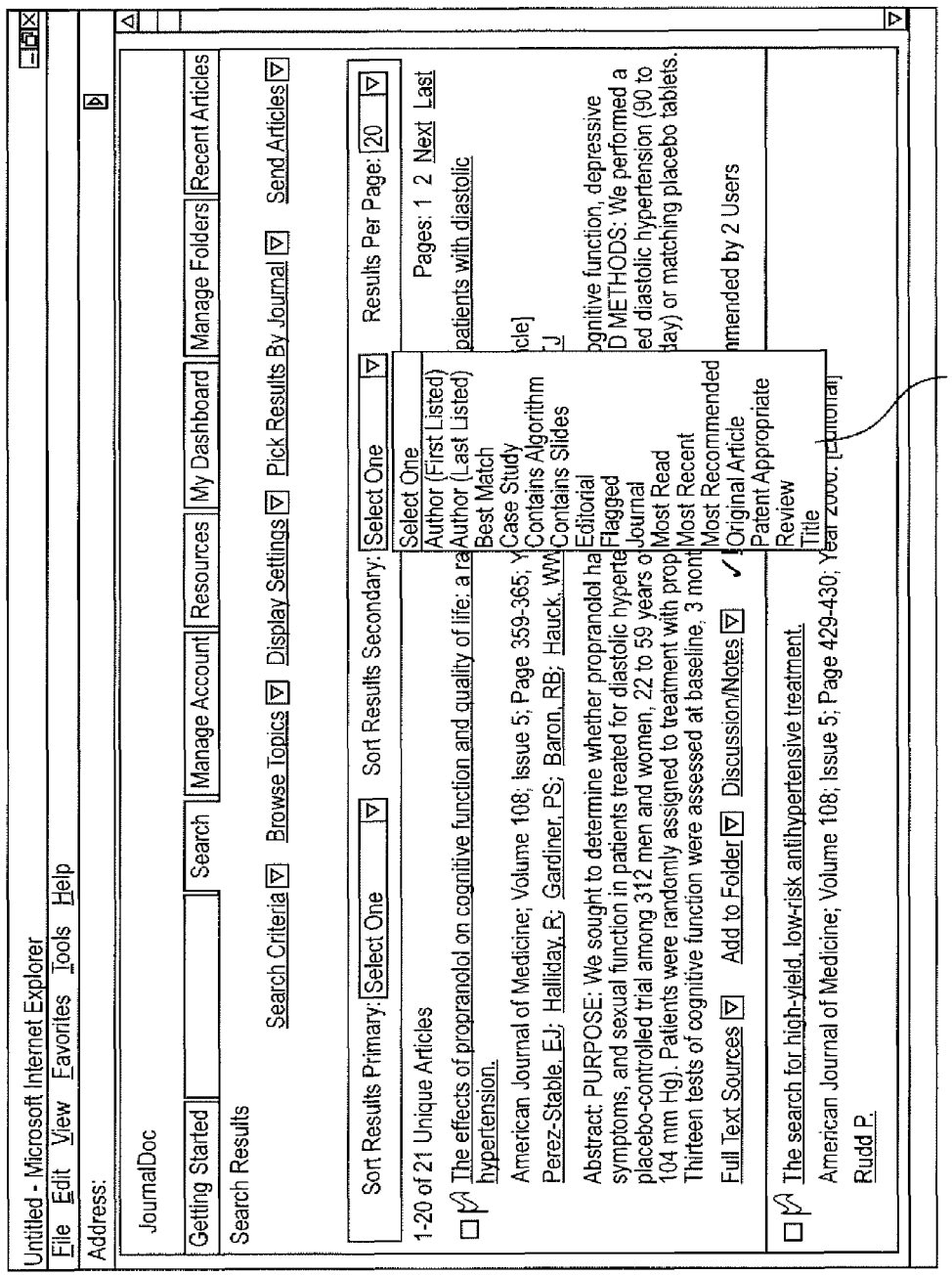

FIG. 7 depicts a preferred screen image for browsing options for a context search criterion, FIG. 8 depicts a preferred screen image for display of search results, FIGS. 9 and 10 illustrate use of the preferred screen image of FIG. 8 to control sorting of the search results by components.

DETAILED DESCRIPTION OF THE PREFERRED EMBODIMENTS OF THE INVENTION

The present invention provides a specialty-oriented, customized database containing current, authoritative and highly relevant information about a topic of interest, and methods for the development and use of such a database. The customized database is organized according to individual specialty or interest areas within the topic of interest, and a database of the invention includes one or more of collections of information for one or more specialty or interest areas.

It is important to an understanding of the approach taken in accordance with the invention to classification and search of an accumulating database to observe that the purpose and goal of document retrieval in accordance with the invention is much different from many other databases and classification systems and search techniques known in the art. Specifically, it has been a primary goal of known databases and search systems to retrieve all documents which may be relevant to the search query and certainly to deliver the most authoritative information available in the database. In other words, these systems deliver a high degree of sensitivity. However, while it may be a secondary goal of known databases and search systems to limit the volume of documents returned by a search (such as by adding search terms to the query) and to avoid so-called false positives (e.g. documents which may have terms matching the search query but which are not or are only minimally relevant to the information sought), the tendency has been to err on the side of inclusion rather than relevancy. This is true even when a search is conducted by a person of substantial experience with the database and search system, such as a librarian using the search system for others on a frequent basis, and is even more problematic when the searcher is a professional using the database and search system only sporadically. In contrast, the database and search system of the present invention seek to provide what may be called an expert system in which a professional, such as a practicing doctor, can rapidly obtain and assimilate the most pertinent and authoritative document(s) in the database but in a limited number and without the return of documents of marginal relevance. In other words, the database of present invention is characterized by a high level of specificity. At the same time, the invention seeks to provide an improved degree of relevance of the returned documents to the particular specialty of the professional without requiring complex or extended search queries or a high degree of familiarity with the database and search system, and to do so at reduced cost for maintenance of the data.

Figure 1A:
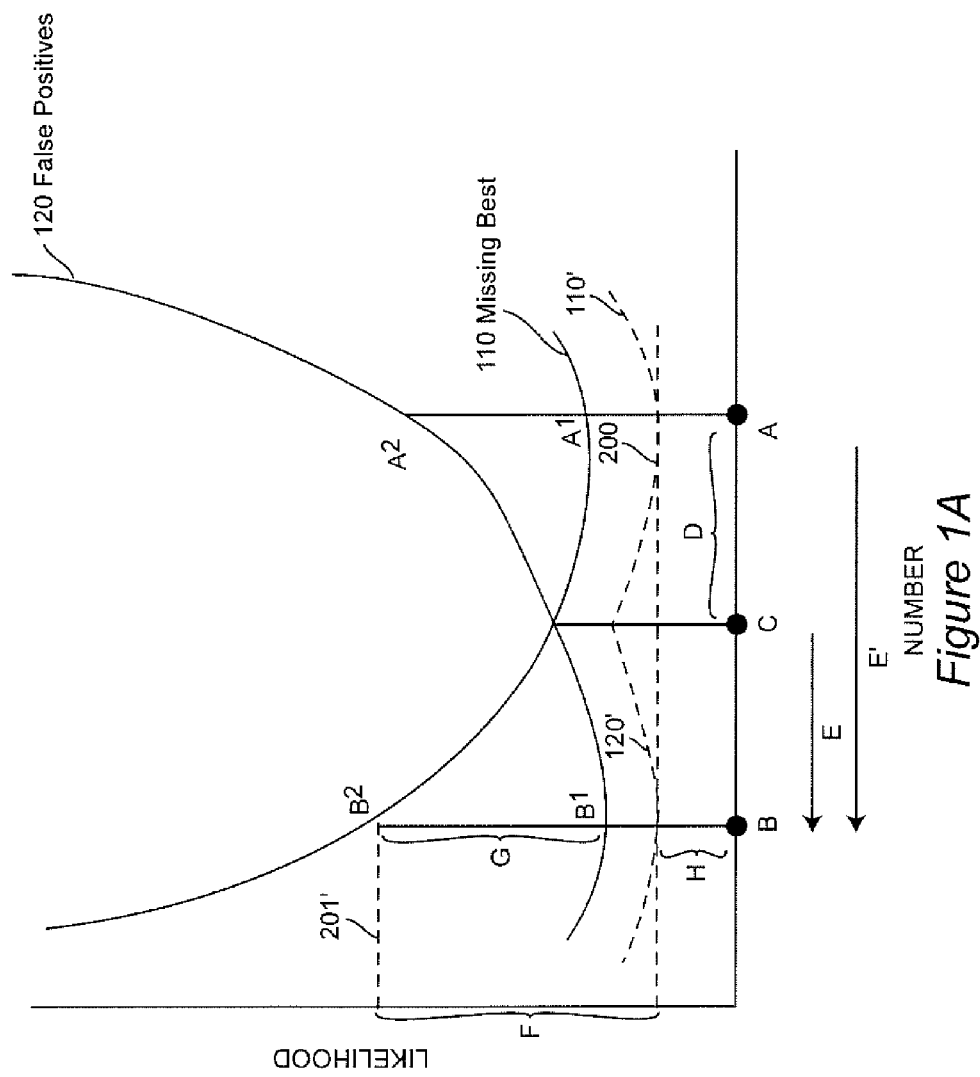
FIGS. 1A and B. A, Graphical illustration of the relationship between the number of terms assigned to a document, number of documents in databases, number of index terms and the like, vs missed best documents and number of false positives per search.

While different criteria may be used to evaluate the efficiency of different databases and search systems in returning the most relevant and authoritative information available, there will be trade-offs between the possibility of documents missed by a given database and the number of returned documents of marginal relevance or false positives both of which detract from the efficiency of the search. Without wishing to be held to any particular theory, this trade-off can be visualized as graphically illustrated in FIG. 1. In FIG. 1, the horizontal x-axis represents a number (such as the number of codes attached to an article in the database, or the number of search terms applied to an article) and the vertical y-axis represents "likelihood" (both the likelihood that the most relevant documents will be missed 110, and the likelihood that a returned document will be a false positive 120), thus representing the inverse of the efficiency of the system. It can be easily understood that as the number search terms available in an index and/or applied to each article increases in number (moving from left to right on the horizontal axis), the likelihood of missing the desired document 110 decreases, and the likelihood of obtaining false positives 120 increases. Both likelihoods would be expected to exhibit minima at different numbers of provided or applied search terms since the potential specificity of the search query can be either too low or too high, and this increases the likelihood of both false positives and missing the most relevant document. For example, at point A, the number of terms is high and consequently the likelihood of missing the best documents is low ($A^1$). However, the tradeoff is that the number of false positive hits obtained is high ($A^2$). In contrast, at point B, the number of terms is relatively low, resulting in many fewer false positives being obtained ($B^1$). However, this is at the expense of a greatly increased likelihood of missing the best references ($B^2$). This implies that the number of search terms provided should be relatively large (e.g. point A) to allow minimization of the likelihood that the most relevant document will be missed 110. Unfortunately, this can only be achieved at the expense of increased levels of false positives 120. This also implies that the efficiency of the search cannot be optimized (e.g. approaching the intersection of the two likelihood curves, implying use of a reduced number of search terms) without substantial expertise of the person formulating the search query (presumably close to point C in range D), if false positives are considered to detract from search efficiency. It should also be recognized that the number of applied or provided search terms is also a measure of the cost of maintaining the data.

However, the inventor has discovered that the meritorious effects of reduction of false positives 120 coupled with an increased likelihood of return of the most relevant and authoritative document 110 (as well as achievement of a reduction in data costs and the ability of users with relatively little experience to perform highly efficient searches) can be achieved by, counter-intuitively, according lesser importance to the likelihood of missing the most relevant and authoritative document during classification and strictly limiting the number of documents as well as the number of search terms provided and applied during classification (e.g. to minimize false positives near point B). Further, by applying substantial expertise during the initial classification of documents, data costs may be reduced (as indicated by arrow E or E'). At the same time, the ease of use by inexperienced users and the likelihood of missing the most authoritative and relevant document are substantially decreased during a more rapidly executed search. For example, at point B, where a low number of terms is used, the minimum of curve 110 (missing best, 110') and curve 120 (false positives, 120') would be shifted to coincide with dashed line 200. This is due to a number of factors, including: reduced numbers of terms, articles, etc.; applied expertise in selecting articles for the database; and a high level of correlation between nomenclature in the database and terminology used in the articles. Bracket F (delimited by dashed lines 200 and 201) extends below the minimum of curve 110, and represents the exemplary total decrease in likelihood of missing the best references using the expert system of the present invention, even when using a limited number of terms, for example, as at point B. Bracket F is comprised of two components: G, the exemplary net improvement in false positive rejection over the prior art due to use of the database of the present invention; and H, the exemplary net improvement of finding the best references over the prior art due to use of the database of the present invention.

Figure 1B:
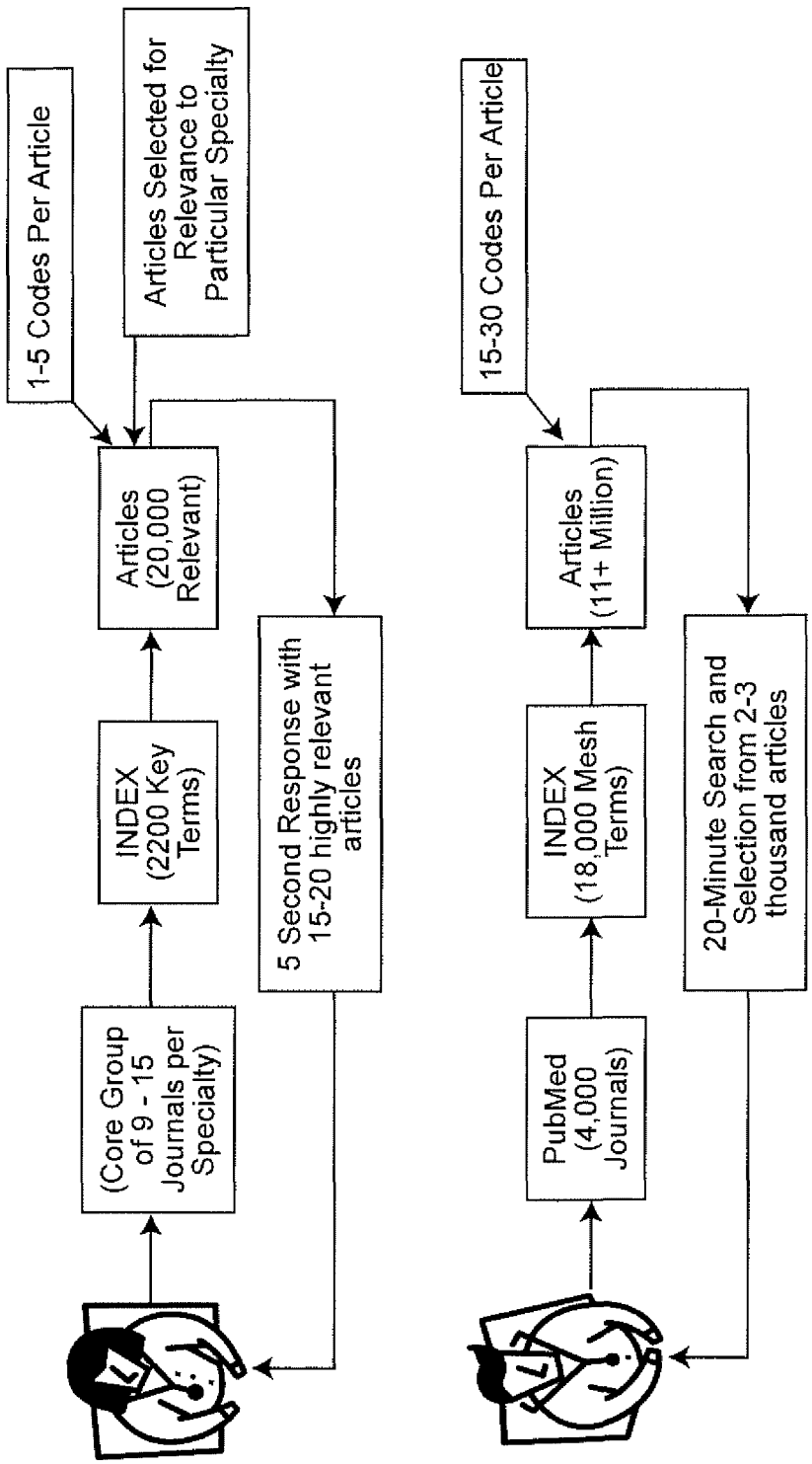

These advantages are further illustrate in FIG. 1B, which shows a schematic representation of document retrieval using the methods and database of the present invention (top panel) compared to the same process using PubMed (bottom panel). As can be seen in the figure, the methods and database of the present invention result in retrieval of a manageable number (e.g. 15-20 in this exemplary scenario) of highly relevant articles. In contrast, a parallel search using PubMed requires much longer to complete the search, and results in retrieval of several thousand documents which the user must still sift through in order to identify those that are truly relevant. The differences are due to, for example, fewer source journals, fewer indexing terms, fewer codes per article, etc., all of which are explained in detail below.

The methods and databases of the present invention are broadly applicable to a large number of fields or topics of interest, and are useful to a wide variety of targeted users. In a preferred embodiment of the invention, the field of interest is health care, where numbers of documents are increasing particularly rapidly, and the targeted users are health care providers (e.g. physicians, nurses, pharmacists, respiratory therapists, etc.) and/or their patients having a particular urgency for search results. While this exemplary embodiment is employed in much of the discussion and examples that follow, those of skill in the art will recognize that the practice of the present invention is equally applicable to other fields of endeavor. Examples include but are not limited to other scientific disciplines (e.g. psychology, biology, engineering, chemical disciplines, etc.), legal information systems, management/business systems, etc. The database of the present invention and the methods associated therewith may be used in any field of endeavor where it is desirable to make available to a user expertly selected information that is highly relevant to a topic of interest, and that can be accessed in a facile manner.

FIG. 2 is a schematic illustration of the development of a database according to the methods of the present invention. Initially, a hierarchical master index or outline is developed by at least one expert in a field of interest (10 of FIG. 2). The master hierarchical index contains a list of general topics (headings) relevant to the field of interest, and may be expanded in a hierarchical manner by the inclusion of subtopics or subheadings (and further divisions if desired or necessary) that fall under the general topic headings. General topics and subtopics for inclusion in the database are typically selected based on the frequency of their appearance in sources of information for the field of interest. For example, in the field of health care, topics are chosen if at least about 5-10 articles per year are published on the topic in major, peer-reviewed journals. In addition, once a preliminary master index is generated, new topics and subtopics may be added to the index if approximately 5-10 articles per year are published on the topic/subtopic. Because the index is compiled by experts in the field, potential new topics/subtopics are readily recognized and monitored, and an informed decision concerning their inclusion in the index can be made with confidence. In preferred embodiments of the invention, a master index contains at most in the range of about 5,000 to 7,000 topics/subtopics.

Each topic/subtopic heading in the master index has an associated code. Codes associated with a heading may be, for example, alphabetical, numeric, or alphanumeric in nature, depending on the preference of the person(s) developing the index. For example, the codes may be or may contain letters of the alphabet, either with a "meaningful" relationship to the topic (e.g. an abbreviation for a specialty) or without direct meaning (e.g. merely an alphabetical outline or index). Alternatively, the associated code may be numeric in nature (e.g. representing the position of the topic/subtopics in the list (e.g. 1, 1.1, 1.2, 1.21, 1.22, 2.1, 2.2, etc.), or alphanumeric, comprising a combination of letters and numbers. Those of skill in the art will recognize that many variations of such codes may be developed, such as various combinations of upper and lower case letters, using Roman numerals, using various types of punctuation to separate individual items in the code, using alphabetic characters from any language for which a database is developed, etc. The important feature is that the code carries sufficient information to unequivocally identify the topic/subtopic in the master index which it represents (i.e. to which it corresponds), and that the meaning and assignment of the codes is consistent within the database.

In particular, for development of a health care database, a hierarchical (tree) Master Index is developed by at least one expert in the field of health care (e.g. a physician). The master index contains a list of general topics (main headings) relevant to the field of health care, each of which is assigned a primary or seminal code such as, for example, a letter. Examples of such general topics and associated primary codes include but are not limited to medical specialties such as Cardiovascular/Peripheral Vascular, Dermatology, Respiratory/Chest, Infectious Disease, etc. with primary codes B, C, V and J, respectively. Other headings may include, for example, topics such as Health Systems and Components with code "Z". Each primary heading may be expanded by the inclusion of subheadings as warranted, e.g. if Infectious Disease is assigned, for example, the designation "J", exemplary subheadings may be as follows: Bacterial Infections, JC; Fungal (Myotic) Infections, JD; Parasitic Diseases, JE; Viral Infections, JF; and so on. The general heading Health Systems and Components, assigned the letter Z, may have expanded subheadings such as Economics, Finance and Insurance (ZC); Medicolegal (ZH); Management and Organization (ZF); etc.

The primary headings and subheadings are expanded in a hierarchical manner by the inclusion of subtopics (and further divisions if necessary or desired) that fall under the primary headings. Examples of suitable subtopics for a general heading such as Cardiovascular/Peripheral Vascular may include, for example: methods/diagnosis; screening/detection; pathophysiology/etiology/diagnostic evaluation; clinical manifestations/complications; prevention/management; etiology/epidemiology; diagnoses/serology; therapy/management; etc. Subtopics, and further divisions of the subject matter, are distinguished from one another in any of several convenient manners, including but not limited to typical outline format, e.g. for the heading Cardiovascular/Peripheral Vascular designated "B", a suitable subheading such as "Arrhythmias/ Heart Blocks—General" may be assigned code "B-4" and further subdivisions of this category developed as necessary. Table I illustrates the development of such a coding system for a Master List (i.e. a "tree structure"), which will be used in a number of applications discussed below.

TABLE 1

B-4 Arrythmias/Heart Blocks-General

B-4.1 Heart Blocks/ConductiveDefects
B4.2 Cardioversion
B4.3 Arrhythmia, Drug Therapy
B4.4 Cardiac Pacing/Pacemakers
B4.5 Supraventricular Arrhythmias-
General
                                        B4.5a Sinus Node Disorders/
                                        Sick Sinus Syndrome
                                        B4.5b Atrial Fibrillation The headings and subheadings of the master index make up the thesaurus of the database (20 of FIG. 2). In the thesaurus, the headings and subheadings may also be referred to as "index terms" or "entries", and provide the basis for searching the database with key words, which may also be used to accommodate different groups of users. In addition, the thesaurus entries may form the basis for an alphabetical version of the index (see below). The thesaurus contains an entry for each term in the Master Index even though entries in the Index may consist of more than one term. Selected entries in the thesaurus will also contain one or more key words related thereto.

Classifications in the Master Index may have multiple terms that may be permuted, for example, in accordance with various punctuation conventions. For example, in Table 1, slashes, hyphens and commas are utilized to indicate the relationships (e.g. near synonyms, conjunctions, grouping of like terms or subjects, specific examples of general terms, conclusions, and the like) between the various terms in the entries. In general, the use of multiple terms per entry is a tool or technique by which the total number of terms in the index may be reduced, adding to the efficiency of the system. In addition, the terms in an entry may be reordered as the system matures, e.g. with respect to relative importance, so that the order of terms in an entry more closely reflects the "state of the art" at the time.

Master Index entries may also include directional entries such as "see" and "see also", referring the user to other relevant headings/subheadings in the Index. The inclusion of such entries has the beneficial effect of overall reducing the number of terms required in the Index. It is preferred that the permuted terms and "see"/"see also" functions of the system represent an approach to accessing articles in the database that reflects the probable approach of the user.

The Master Index may be modified as necessary by the addition or deletion of terms in the Index. For example, new topics or subjects may be added empirically based on the frequency of their publication in medical journals. As a general rule, there should be at least six articles published on a subject in the past year before a term is added. However, at the discretion of at least one expert, new topics may be added with the expectation of multiple future publications. Such topics might include those describing a new, mutant form of a flu virus, or the documentation of the initial outbreak of a potentially serious epidemic. A new term may be added as a separate new topic, or as an addition to an existing topic (e.g. connected by a slash or hyphen). In general, no more than 3-4 terms should be connected in this manner. Such additions (or deletions) are made only directly to the Master Index.

Similarly, a term may also be deleted from the Master Index if warranted. Deletion of a term may be appropriate, for example, if no new articles on a topic have appeared in the core journals for a specified amount of time, e.g. for 5 years. The periodic removal of articles from the database (discussed below) may eventually result in certain sections (e.g. "folders" associated with a particular heading/subheading) of the database being "empty" or nearly so. Such a section would be a likely candidate for deletion, and any remaining contents redistributed (e.g. to the hierarchical parent heading or subject heading, or laterally combined with another heading or subheading). Ultimately, once a Master Index is complete, the terms in the Master Index may be used to generate "Specialty Indices" for use by specialized groups of users, as is described in detail below.

Once a Master Index and its associated thesaurus are established, sources of information for inclusion in the database (e.g. professional journals) are identified (30 of FIG. 2). In preferred embodiments, the information is in the form of written texts, which may be in electronic form. Examples of such sources of information include but are not limited to: professional journals, newspapers, books, various collections of abstracts, lectures, CME or other continuing professional education courses, material from other professional and lay sources, etc. In a preferred embodiment, the sources are professional journals, and this exemplary source is referenced in much of the following discussion, but should be understood as applicable to any other potential sources.

In the embodiment of the invention in which the field of interest is health care, the sources of information may be professional journals selected from those pertaining to the medical specialties that are to be included in the database, e.g. those that are in the Master Index. "Medical specialty" means one or more of the 120 specialty areas of medical practice that are currently recognized by the American Medical Association, e.g. cardiology, gastroenterology, gerontology, nephrology, etc. Those of skill in the art will recognize that medicine is an evolving field, as are many others, and that new areas of specialization are continually developing. All such emerging and/or future specialty areas are also intended to be encompassed by the present invention. These may or may not be well-accommodated by existing systems or services. In addition, indices and databases according to the present invention may also be developed for health care professionals other than physicians, e.g. nurses, respiratory therapists, pharmacists, etc. Further, those of skill in the art will recognize that, in other (non-health care) fields of interest, other suitable organizing frameworks may be utilized. For example, if the field of interest is botany, the database may be organized according to any suitable and convenient subdivision(s) of the field, e.g. by phylogenetic classification, by geographical location, by uses of or products produced from a plant, etc. In the field of law, subdivisions could be, for example, torts, property law, contracts, etc. Any convenient grouping(s) of topics within a field of interest, of any desired breadth, may be utilized in the practice of the present invention.

While sources of information for a medical specialty typically include professional medical journals directed to the specialty, they may also include sources such as lectures, CME or other continuing professional education courses, etc. According to the practice of the present invention, selection of the information sources is carried out by at least one medical expert or specialist in the medical specialty. In general, "experts" or "specialists" in a medical specialty are individuals who are board certified in that specialty. Those of skill in the art will recognize that, for other fields of interest, an "expert" will generally be an individual with an advanced educational and/or work experience in the field. The use of experts in the field of interest provides one level of assurance that the most relevant sources are utilized, and that marginally relevant sources are not.

In addition to comprehensive databases for a field of interest, the indexing system of the present invention may also be made available in forms designed for individual use. For example, a professional in the field of health care may utilize such a database to categorize and later retrieve information of personal importance, for example, lecture notes used in teaching, references cited when writing manuscripts, various publications of interest, and the like.

For a medical database, for which the targeted user is a clinical practitioner, it is preferred that selected journals meet the following exemplary criteria:
1) The journal contains articles that are primarily clinical in nature.
2) The journal contains articles that are peer-reviewed.
3) The articles in the journal are written in a language appropriate for use by the targeted user. In a preferred embodiment, the articles are in English. However, this need not be the case if the language of the targeted users is not English.
4) The articles in the journal(s) would, in the opinion of expert(s) in the specialty, provide over time 90-95% of the information needs of practitioners in the specialty, and/or articles in the journal would be of interest to the majority of physicians in the specialty.

The primary group of journals contains at least 1 to at most about 50 journals, preferably at least 1 to at most about 25 journals, and most preferably at least about 5 and at most about 10-15 journals. Those of skill in the art will recognize that the precise number and identity of journals in the primary group may vary from specialty to specialty, and may fluctuate over time. The number may change due to, for example, the introduction of new and/or the disappearance of old journals in the field, or changes in format or orientation of a journal with time, which can impact the suitableness of a journal for inclusion in the core group, etc. The frugal, expert selection of primary journals helps to insure that only highly relevant, robust articles are included in the database, i.e. articles from sources that are only nominally relevant to the field or of dubious quality are not even considered for inclusion in the database.

Once the primary group of core journals is established for a specialty, each article published in a core journal is evaluated according to preestablished criteria, for inclusion in or exclusion from the database (40 of FIG. 2). For example, in the case of professional medical journals, articles that are included in the database will be those that are, according to at least one expert in the specialty, highly relevant to practitioners. Such articles include but are not limited to human case studies, review articles, research articles, editorials, miscellaneous articles of interest, etc. This initial evaluation may involve assigning a "type" code to each article that is selected, e.g. articles types that are excluded may be: book or product reviews, letters to the editor, abstracts or summaries of articles from other sources, course announcements; current events or news articles, announcement of faculty or academic appointments, etc. Those of skill in the art will recognize that the inclusion/exclusion of articles based on article type is flexible, depending on the type of database being assembled, the desired size of the database, the targeted user, the potential use by the targeted user, etc. For example, a marketing database intended for use by sales professionals might include only product or book reviews, or articles describing research in which a particular product of interest is used, and exclude all other articles. This initial screening by experts of articles in the core journals prevents indiscriminate inclusion in the database of articles that are only peripherally related to the medical specialty, thereby assuring the importance and relevancy of all articles that are chosen for inclusion, and in general decreasing the number of articles in the database.

It should be appreciated that the assignment of type codes to particular documents or articles may or may not be used further in searching, classification or for other purposes. One function of assigning type codes is to systematize the process of determining whether or not a document or article is to be included or excluded from the database. If that is the only purpose and only a single database is to be developed, the assigned type need not be included or maintained with classification data assigned to the article or document or considered further in the course of classification or search. However, other conditions may exist such as the necessity of obtaining a copyright license to all or certain subsets of articles of some journals (rather than to individual articles) or certain potential needs of target users of the system to make all articles or documents accessible through the system even though not classified under the same classification system or searched in the same manner as the articles or documents chosen for specific inclusion in the database. It may also be desirable to simultaneously develop plural databases for different target user groups, each database including a different type or combination of types of articles or documents and which may be classified and searched in different ways. It may also be desired to use specific assigned types to refine search results to exclude certain types after the search results are returned. For example, a user may be interested in reviewing only articles of a particular genre (e.g. review, original, etc.) and use of the type code will allow sorting and or selection of the search results accordingly. Thus, types codes may be valuable depending on the use of the articles, e.g. a doctor who is preparing to give a lecture to students or to study for board exams may require only review articles, whereas a doctor researching treatment options for a patient may require only original articles. Alternatively, the type of article that best suits the user's need may depend on the knowledge base of the user, e.g. when beginning study in an area, a review article may be most appropriate, whereas original articles are more suitable as the knowledge base of the user progresses. In any of these and other possible uses of assigned types, an additional code or other designation may be applied to the articles or documents and maintained in much the same manner as the classification designations as will be described below. In summary, maintaining the assigned type information with the document can be accomplished with little storage overhead and allows articles to be dynamically sorted at any point or points in the classification and/or search processes for any of a wide variety of purposes.

Those of skill in the art will recognize that other suitable generic types of articles may also be selected, depending on the nature of the database being constructed. Examples include but are not limited to: articles written during a particular time period, articles authored by a particular individual, etc. In a preferred embodiment of the invention, the database is related to health care, and the articles that are selected for inclusion fall into one of the following five categories: original, editorial, review, case, or miscellaneous.

Those of skill in the art will recognize that, in many fields, including health care, professional journals are typically published periodically. In a preferred embodiment of the invention, the database of the invention includes articles that were published no more than about ten years ago, and preferably no more than about five years ago. In some embodiments of the invention, the database is routinely purged of articles that were published prior to a specific date. Further, the period of retention of articles may depend on the specialty at issue, e.g. for health case management (where terminology in general does not evolve rapidly) a 10-year retention period may suffice. In contrast, in a field such as cardiology, where progress in the field tends to be very rapid and methods become obsolete within a short period of time, a shorter retention period may be suitable in order to maintain relevancy of the database entries. In other embodiments, special categories of important "classic" or "benchmark" articles are established for articles that are to be retained in the database indefinitely, regardless of when they were published.

One distinct advantage of the database of the present invention is that it is more current than other comparable databases that are at present available. In general, the time from availability of information to its inclusion in the database is no more than about 10 days, and preferably no more than about 7 days or less. This is in contrast to, for example, the MEDLINE database, which has at least about a 6-10 week lag between publication of an article and its availability in the database.

In accordance with the invention, each article selected for inclusion in the database is assigned at least one code from the Master Index (50 of FIG. 2). For example, in the case of a health care database, an article describing atrial fibrillation may be identified as primarily relevant to the B4.5b Atrial Fibrillation subheading in the Cardiovascular/Peripheral Vascular (B) portion of the Master Index. The article would thus be encoded "B4.5b". Alternatively, an article may contain information that makes it pertinent to more than one heading/subheading of the Master Index. For example, an article concerning atrial fibrillation may describe a study in elderly patients, and thus be coded as relevant to both the Cardiovascular/Peripheral Vascular and Gerontology sections of the Master Index. The article would thus be tagged with two separate codes.

In a preferred embodiment of the invention, the number of codes assigned per article is kept at a minimum in order to foster relevancy and manageability of search results obtained by a user of the database. Thus, each article is assigned no more than about 20, and preferably no more than about 15, and more preferably no more than about 10, and most preferably from 1 to about 5 codes. The present invention is thus distinguished from databases such as MEDLINE, which utilize a thesaurus containing approximately 30,000 index terms, and in which a single article is typically assigned as many as 30 or more codes based on the index terms.

On occasion, it is possible that no suitable Master Index code exists for an article that otherwise meets the criteria for inclusion in the database. This may occur, for example, when the article deals with an emerging medical issue. In this case, as the discretion of the expert, the article may be "held" in a special grouping of articles of similar status. If, with time, the topic appears to be viable (e.g. by the appearance of other related articles), a new Master Index term/code may be developed for the subject matter. The related articles are then encoded with the new code and entered into the database.

Once an article is suitably encoded with respect to the Master Index codes, a second level of classification is imposed in that the article is identified as relevant to one or more specialty collections within the database (60 of FIG. 2). This level of classification results in the article being assigned to or included in suitable specialty collections of the database, and this determination is made by experts in the specialty associated with the core journal from which the article was taken. There is no limit to the number of specialties to which an article may be deemed relevant. For example, in the case of a health care database, an article concerning health care costs that is encoded "ZC" according to the Master Index (subheading ZC: Economics, Finance and Insurance under general heading Z: Health Systems and Components), may be relevant to all specialty collections of the database, e.g. dermatology, hematology, geriatrics, pediatrics, etc.

This procedure is illustrated in FIG. 3, where 210 represents a list of articles in a Table of Contents (TOC) of a professional journal that has been selected as a core journal. In one embodiment of the invention, two hard copies of the TOC are made and annotated by hand. Copy 1 is annotated to indicate which index terms/codes (from the Master Index 220) will be assigned to the article, and Copy 2 is annotated to indicate the article type, and the specialty collections to which the article will be assigned, taken from a List of Specialties 200 that are to be included in the database. Alternatively, the annotating of the TOC may be done electronically. Further, the listing of articles is not necessarily a TOC of a journal, but may be any other suitable listing of articles (or other types of information) that are being indexed. For example, a listing of articles from which all articles that are not suitable for inclusion in the database have already been eliminated may be used.

In the embodiment of the invention in which the database is a health care database arranged according to medical specialties, an article is classified as suitable for inclusion in one or more specialty collections 60 in FIG. 2; 230 in FIG. 3). In other words, the article receives a "specialty classification" or "specialty designation". Having been initially selected from a primary core journal for a particular specialty, it is likely that an article will be assigned to the collection for that specialty. However, the article may also be deemed relevant to other specialty areas, and may be assigned to them as well. In general, there is no limit to the number of specialty classifications/designation which may be assigned to an article. Journals from which articles are indexed across specialties (i.e. the article originated from a core journal of one specialty, but is assigned to other specialties collections as well) make up a group of "secondary source" journals for the specialties to which the articles are cross-indexed. Secondary journals for a particular medical specialty are thus introduced by medical experts who are indexing for other medical specialties, and who identify articles of interest from their core group of journals that should also be included in the particular specialty index. For example, an article from the cardiology core group concerning heart disease in senior citizens may be deemed by a cardiology expert as suitable for inclusion in both the "cardiology" and "geriatric" specialty collections. Other examples of articles that are likely to be assigned to more than one specialty collection include but are not limited to review articles, articles that discuss links between one specialty and another, articles that discuss issues broadly related to health care such as health care costs, insurance, legal issues, etc. In general, the secondary group of journals comprises in the range of about 1 to about 50 journals, and preferably in the range of about 5 to about 30 journals, and most preferably in the range of about 10 to about 20 journals.

As an article is imported into a specialty collection, its associated code (from the Master Index) is imported with it and is established as a heading in the specialty collection (70 of FIG. 2). In other words, the codes assigned to the article migrate intact with the article into one or more appropriate specialty collections. If other articles with the same Master Index code are already present in the specialty collection, the newly imported article is automatically added to the list of articles already under that index heading. However, if there are not already other articles with an identical Master Index code, then the Master Index code associated with the new article is automatically added to other codes already present in the specialty collection. (The other codes, also from the Master Index, would have been associated with articles that were previously imported into the specialty collection.) Thus, as new articles are added to a specialty collection, they are either placed under suitable existing headings/subheadings in the specialty collection, or new headings/subheadings are generated in the specialty collection to accommodate the new articles. In this manner, each specialty collection builds up its own list of articles grouped according to headings/subheadings of the Master Index, i.e. each specialty collection develops its own hierarchical specialty index (i.e. a hierarchical index for that particular area of interest, 230 of FIG. 3), which is typically a subset of the Master Index. This, in essence, results in the creation or development of a plurality of specialty indices or databases. Further, this prevents the creation of "empty folders" in the specialty collection. There are no headings/subheadings, etc., in the specialty collections that do not contain at least one article. The exception would be the case in which, over time, all articles in a heading/subheading had been purged (e.g. five years after being placed in the "folder" associated with the heading/subheading) and no new articles had been added, as described above where the deletion of sections of the Master Index is discussed. In general, such a specialty index will contain in the range of about 2,000 to about 3,000 topics/subtopics.

For example, an article about HIV in children originating from an infectious disease journal, would likely be classified in the infectious disease specialty collection under the heading "HIV". However, since the article also is concerned with children's health, it may be appropriate to include the article in the pediatrics specialty collection, for which no HIV heading exists. However, the inclusion of the article in the pediatrics specialty collection automatically generates the new "HIV" heading in the pediatrics specialty collection.

The present invention also comprehends separate, specialized consumer indices and databases. The indices are developed by experts in a manner similar to that of the Master Index of the present invention, except that the index terms are "lay" terms and the information/articles included in the database are suitable for review by persons who are not experts in the field. For example, the entry "heart attack" might replace the term "myocardial infarction" from the master index while being assigned the same associated code. Other techniques will be apparent to those skilled in the art such as providing a look-up table where several "lay" terms or phrases of similar meaning or connotation may be provided as may be convenient or as colloquial usage may dictate to point to a given master index term or its associated code, much in the manner of the thesaurus discussed above which can be arranged to perform this function. Typical users of this version of the database are likely to be, for example, patients/consumers of health care and/or their families.

In this regard, it should be appreciated that language or terminology used in a given profession or specialty will have usually developed in a manner to be extremely precise and unambiguous. Nevertheless, some terms may be homonyms or, more specifically, homographs, and have more than one distinct usage or meaning where the specific, intended meaning is to be derived from the context in which the term or phrase is used. For example, even within the medical profession, the term "depression" may be used in several different ways such as to denote a mental disorder, to denote a reduction of a function (much is the sense of "suppression"), to connote a deformity or injury such as a depressed sternum or a depressed skull fracture, or to connote medical or physical symptoms or behaviors related to economic depression, to denote impacts of economic depression on the economics or management of a medical practice or the like. It is to be expected that the existence of any homonyms or homographs among master index terms that may be assigned to articles as discussed above will adversely impact the search results and whether or not a given article returned by a search will be deemed to be relevant to a user. It is also to be expected that the number of homonyms or homographs will be greater in indices of "lay" terms and even more adversely compromise the efficacy of a search.

The invention, in accordance with a perfecting feature (e.g. optional in regard to the basic principles of the invention but preferred and providing additional functionality or improvement) thereof, avoids such adverse effects without requiring additional individual coding/classification for such homonyms or homographs and entirely within the classifications for keywords, specialties and, optionally, the intended use(s) for which an article may be deemed particularly suited, as alluded to above. This is preferably achieved by providing for searching of particular contexts as illustrated at 610 in FIGS. 6A-6C. The option for context searching may be provided for all master index terms or only for those which are recognized as homonyms or homographs. In the latter case, it is preferred to provide a tag or flag on the term in storage for purposes of selecting an interface screen either including or omitting that additional search criterion. Alternatively, a short menu can be linked with particular key words in storage and the interface screen appropriately controlled based on the presence or absence of menu data associated with a given key word. No such provisions are required if context searching is to be provided for all key words. For that reason and because context searching will necessarily improve search result precision, it is preferred to unconditionally provide context searching for all key words used in the key word classification.

It will be recalled from the foregoing that the invention provides for use of particularly short and simple search queries based on a key word (which need not actually appear in the article or document) classification and a specialty classification and, optionally, on an additional intended use or application classification, as alluded to above; which are selected from limited lists that are preferably arranged in a hierarchical manner (e.g. which can be visualized as a tree structure), and that more than one key word and/or specialty may be applied to a given article or document. (As shown in FIGS. 6A-6C, an option is preferably also provided which allows a search based on the text of Abstracts of the articles in the database rather than key words applied during the above-described classification of articles since the terminology in the abstracts is deemed to be a good indicator of the basic "thrust" and emphasis of respective articles.) When a search is to be performed, the key word and specialty are sequentially input (the order of entry being of no particular importance although it may be more convenient to enter a specialty first since that will limit available key words to those provided in the corresponding specialty index that is a sub-set of the terms provided in the master index) and the combination of the key word and the specialty which have been input form the basic search query which results in a (limited) group of documents having such a combination of classifications being returned. It should also be recalled that the specialty that is selected is likely to be the professional specialty of the user of the invention and that, as such, the articles or documents returned will be of particular relevance to that specialty.

The addition of a context component to the search can be implemented by storing a mapping of the different potential usages of a key word to key words and/or specialties where a particular usage is of particular relevance or where there is a significant frequency of such usage. Thus, for example, if the intended context of a the key word "depression" is the economic context, a link may be provided to appropriate classifications of the Health Systems and Components headings (e.g. those coded with a "Z" designation, as described above). Similarly, if the context of "depression" is mental disease or effects incident to a medical condition, event or treatment, a link can be found to a corresponding key word or specialty such as mental health/development. Preferably, however, a menu which can be invoked from symbol 625 is provided which is composed of the key words at a particular hierarchical level, preferably the highest or least specific level (e.g. the first branching above the root of a hierarchical "tree" data structure) in the limited hierarchical list of key words. Essentially, selection of symbol 625 or any other action to provide context searching invokes a limited and directed "browse" function of a given level of the hierarchical key word index of either the body systems/specialties database or the health management systems and components ("Z" classifications) database for the specified specialty which already exists in storage, an exemplary screen for which is shown in FIG. 7. (It should be noted that both body systems and specialties are included in the same tree structure since, for example, the term "geriatrics" may be a specialty or a sub-set of patients.) Thus, as shown in FIG. 6A-6C if the key word "depression" and specialty "internal medicine" are input, a context search field 620 is displayed because "depression" is a homonym or homograph and a symbol 625 indicating a menu is preferably provided (as is also preferably provided for the specialty field but preferably not for the key word field in view of the much larger although limited number of terms and hierarchical levels of terms). The content of the menu is preferably the topics or terms at a particular hierarchical level (preferably near the first branch from the root level) of the limited hierarchical tree structure containing the key words from which a selection can be made for context search field 620. Further context/subtopic fields 630, 635 can also be displayed, preferably in response to selection of a term for context field 620. The menus which can be displayed for fields 630 and 635 are preferably the terms/key words at the next hierarchical level of the same specialty index relative to the term/key word entered in context field 620. This ordered access to hierarchical levels of the key word list serves to direct and facilitate browsing by the user. Further context/subtopic fields with menus corresponding to successive hierarchical levels can be provided through any or all of the hierarchical levels of the specialty index. Each additional term added to the context 610 in this manner will serve to further refine the search and reduce the number of articles or documents returned while increasing the likelihood that the ultimate search results will be deemed relevant to the user.

It should be appreciated that providing for building of a search query including a context specification avoids the need to formulate a "Boolean" logical search query and sequentially add terms and their relationship to other terms to limit the number of documents returned and also avoids the potential for loss of relevant documents from the search results that may be unwittingly caused by a Boolean logic search query based on the text of respective documents. It also avoids the need for any particular level of acquired skill in formulation of Boolean search queries on the part of the user. Since all elements of the search query are matched to menus reflecting index term classifications of documents which already exist in memory, errors in formulating the search query that may occur as terms are added to a Boolean search query are substantially avoided. Further, the use of menus can serve to guide the user through the construction of the search query in a manner which largely reflects the content of the database in regard to the specified specialty. Moreover, the highly counter-intuitive process of refining the search through reference to (at least initially) less refined levels of the hierarchy of index terms also avoids the need for further classification of articles/documents and can refine the search to return only a very few highly relevant documents (an exemplary screen being illustrated in FIG. 8) without resulting in possible exclusion of all articles/documents in the database which can easily and often occur as terms are added to a Boolean search query. In other words, the user can only specify, as a context, terms which have been included in the specialty index by virtue of a classification applied to an article or document. That is, the user is not presented with an option of selecting an "empty folder". Increased search accuracy and efficiency are assured since the index term classifications are searched as context for the key word specified in the search query rather than seeking to refine the search results by filtering, sorting or other logical operations on a prior search result.

Referring again to FIG. 8 and additionally to FIGS. 9 and 10, a further perfecting feature of the invention referred to as a component sort or filter will now be discussed. Specifically, once a search has been conducted, the invention preferably provides for a further refinement and sorting of the search results based on the components contained in the respective articles or documents. Components of articles or documents are particular content or attributes of content of the articles or documents such as a graph, equation, algorithm, illustration or photograph, radiology image, pathology slide(s), information which may appear in a particular location in an article or field of metadata for the article such as author (e.g. to find additional articles by the author of a selected or flagged article), title, type or intended/appropriate use of the article as may be provided by an additional classification as alluded to above (e.g. case study, journal article review or editorial or uses such as treatment of a patient preparation of a lecture or research paper or the like) or information which may be collected or determined about the article such as best match to a selected or flagged article, whether the user has flagged the article (flagging or selection being achieved by, for example, marking display feature 810), most read, most recent, most recommended (e.g. as illustrated at display feature 820) or the like. These options are provided to the user in a display bar 830 which provides access to menus through display features 840a, 840b. Exemplary menus 910, 1010 (which should not be considered to be exhaustive of the sorting or search refinement filtering options that can be provided) are illustrated for the primary and secondary sort criteria, respectively in FIGS. 9 and 10. Any number of ordered sorting and/or filtering criteria can be provided. Any known sorting and/or filtering technique is suitable for performing the sorting and/or filtering as may be specified from such menus as long as the content of both the article and corresponding metadata for the article are accessible. It should be understood that any desired metadata in regard to components of articles may also be provided as an incident of classification or similar operation if not supplied by the publisher of the article or document. It should also be appreciated that the facility for sorting based on such criteria provides for substantial search refinement supplementary to an intended use classification and search criterion which may be optionally provided as alluded to above and illustrated at 650 of FIG. 6.

The invention also preferably provides Key Article Collections ("KACs") within the database. A KAC (250 in FIG. 3) is derived from the specialty indices, and is a collection that contains the "best" articles published on particular topics during a defined time interval, e.g. each quarter. The number of "best" articles in a KAC is arbitrary, but in preferred embodiments, about ten best articles will be chosen. The articles are selected by experts, and are a qualitative source of information for the user. For example, in the case of a health care database, the KACs are a qualitative source of information for health practitioners (e.g. physicians) with interest in a particular area, e.g. osteoporosis, cardiac arrhythmia, etc. The articles in a KAC have no quantitative denominator; i.e. whether 100 or 1000 articles are published on the topic during a quarter, the KAC contains e.g. the ten best. The expert may also add an expert commentary on each article included in the KAC, and/or on the field of interest in general. Further, the expert may add additional references beyond those found in the core journals, if such an article is, in his/her judgement, deemed to be "one of the best" during the time interval. The KACs may also contain a question module containing questions based on the information presented in the articles in the KAC for use by physicians studying for Board exams. The questions are compiled by experts who review the key articles and who are familiar with the format of Board exam questions. KACs with a question module thus provide an efficient way to review for Board exams.

Further, KACs may also be developed for health care professionals other than physicians, e.g. for nurses, respiratory therapists, pharmacists. Such KACs would be organized along the same lines, but would contain articles pertinent to each particular specialty derived largely from Master Indices and databases peculiar to the specialty.

In addition, the database may provide collections of articles that are especially chosen by experts for use by lay health care consumers. Such collections typically include fewer articles per topic than the KACs (e.g. from about 5-10 and preferably from about 7-10). The precise number of articles may vary, depending on any of several factors, including but not limited to availability of suitable articles, demonstrated patient interest, etc. Patient collections may also include commentaries on the articles that are written in lay, technical, or the like terms by experts in the field, and indexed by similar terms via terms included in the thesaurus entries.

In one embodiment of the invention, sponsored corporate messaging is incorporated into the database, for example, in the subject level of the Master Index, or in a KAC collection. For example, in the case of a medical literature oriented database, pharmaceutical and biotech companies may be offered unique placement advertising spaces and/or links that are associated with suitable topics in the database, e.g. an advertisement for a diabetes drug, and a link to the web site of a manufacturer, may be uniquely placed in a section of the database dealing with diabetes. In another embodiment of the invention, professional versions of the database without sponsorships, or provided via an educational grant from a single sponsor, are provided.

The databases of the present invention are suitable for use in a variety of scenarios. For example, the databases may be accessible via the Internet at sites that subscribe to a service providing them. Alternatively, databases may be provided via an in-house Intranet, for example, in a hospital or research facility. Further, individuals may subscribe to the database. Due to the manageable size of the database, it can be readily accessed by portable devices such as Personal Digital Assistant (PDA) devices (e.g. Palm- and Pocket PC-platform, and other hand-held computers). The databases of the present invention may be employed with any electronic device capable of downloading the database and providing database access to the user.

The present invention also provides a search engine for retrieving information in the customized database, and methods of using the search engine and database. Searches may be carried out in three ways: 1) by using key words/phrases which are linked to the index terms of the thesaurus of the database (which correspond to the codes assigned to each article as well as to the individual terms in the Master Index entries); 2) by directly accessing the indices of specialty collections; and 3) by directly accessing an alphabetical listing of the headings/subheading of indices of specialty collections. For example, a user may type in key words or a phrase such as "heart valve" with or without Boolean operators and the search engine will retrieve articles that have been assigned codes corresponding to index terms containing the phrase or one or more words in the phrase, such as, for example, "Hear Valve Surgery". Such "key word" searches are known to those of skill in the art, but according to the present invention, will typically result in retrieval of a fewer, manageable number of documents, all or the vast majority of which are highly relevant to the search terms. In addition, although the search engine is focused on the database of the present invention, links may be provided to other plenary database systems, e.g. MEDLINE.

Alternatively, the user may directly access the specialty indices and "scroll through" (i.e. browse) the headings/subheadings, etc., listed therein (i.e. through the outline or tree structure) until suitable articles or groups of articles are located. Finally, the user may directly access and "scroll through" an alphabetical listing of specialty indices. The development of an alphabetical listing of the articles in a collection may be carried out in any of several manners, so long as the method is consistent and results in a suitable alphabetical listing of the index terms in the specialty collections of the database. For example, when a database term is comprised of several connected items (e.g. A-24.2, Health Foods/Megavitamin Therapy/Dietary Supplements), the articles in this section of an index may be alphabetically indexed separately under Health Foods, and Megavitamin Therapy, and Dietary Supplements. Alternatively, depending on the initial design of the Master Index terms, some "connected" items in a term may be treated as a single entity during alphabetization. Any convention regarding alphabetization of the index may be used, so long an consistency is maintained, and the end result is efficient and accurate access to all articles in the index. Further, the alphabetical index may lead directly to the articles contained therein (e.g. by "clicking" on the term displayed on a computer monitor), or may simply direct the user to the appropriate section of the index, e.g. "See section A-24.2".

The frugal choice of articles for inclusion in the database, coupled with the frugal assignment of codes per article, both carried out by experts, results in the retrieval of a small, manageable number of highly relevant articles per search by a user of the database. According to the present invention, a "manageable number" of articles is generally in the range of no more than from 1 to about 50, preferably from about 1 to about 35, and most preferably from about 5 to about 20, articles. However, for some applications, a "manageable number" may be considerably higher, e.g. up to about 200 or more. The search results will usually be in the nature of a small number of "folders" or "bins" (or Boolean combinations thereof) each corresponding to a particular classification in a specialty and including a relatively small number of documents or articles. These search results may be refined by, for example, a text word search (which can be rapidly carried out on the small number of documents and which can be performed based on a relatively simple query since virtually all false positives have already been removed) and/or assigned type exclusion, as alluded to above. Due to the expert selection and coding of articles, those articles that are retrieved in response to a query of the database are highly relevant and will contain few or no false positives. In addition, users of the database of the present invention need not be concerned about missing relevant articles because the entire selection and classification procedure is carried out by experts in the specialty.

When a database contains more than one specialty collection of articles, the specialty collections may include lateral links to one another (230 in FIG. 3). For example, within an Internal Medicine specialty collection, secondary articles may be included under the topic of "Atrial Fibrillation". If a user desires to obtain more information, it is possible to link laterally to the Cardiology specialty collection and to access the topic of "Atrial Fibrillation" where a larger number of articles will reside, derived from primary core journals. Because the primary sources of articles for the two specialty collections are different, articles under an index term in one specialty collection will generally differ from articles under the same index term in another specialty collection, and may be sorted by Boolean operations. However, in cases where an article does occur in both collections, the search engine may be provided with a feature that suppresses duplication, i.e. articles appearing in the second specialty collection will be blocked if they were already present in the first accessed speciality collection.

In general, the retrieved articles are initially presented to the searcher by title and abstract. In some cases (e.g. in the KAC collections), a commentary may accompany the title and abstract discussing, for example, the major points or purpose of the article, observations that would guide the reader to understanding the content of the article, etc. Such a commentary would be developed by an expert in the field with which the article is concerned. In addition, links to the full articles are provided. In some embodiments of the invention, a full article is directly available within the database. In other embodiments, a link to a web site (e.g. a publisher's or author's web site) is provided. In some embodiments, a combination of these means of article access is used. In a preferred embodiment of the invention, all articles are available in full within the database.

EXAMPLES

Example 1

Coding of an Article and Assignment to Specialty Collection

FIGS. 4A and 4B show a representation of an exemplary Master Index for use in the development of a healthcare database. FIGS. 4A and B show only the most general heading and subheadings of the Index. Detailed exemplary sections of the Index within the B (Cardiovascular/Peripheral Vascular) and V (Respiratory/Chest) headings are given in FIGS. 5A and B, respectively.

For the development of, for example, a Cardiology specialty collection within the database, a group of core professional journals is selected by at least one expert in the field of cardiology. One of the journals that is selected is, for example, *The American Journal of Medicine*. In order to develop the specialty collection, the table of contents (TOC) of an issue of the journal is reproduced and each article that is deemed suitable for inclusion in the collection is classified as to type (e.g editorial, review, case study, original or miscellaneous). For example, the article entitled "Atrial Flutter and the Risk of Thromboembolism: A Systematic Review and Meta-Analysis" is classified as an "R" document, for "review". This may be noted directly on a copy of the TOC, e.g. in the space at the left of the article title.

Subsequently, the article is then coded by an expert in cardiology with aa code or codes (e.g. an alphanumeric code) corresponding to appropriate sections of the Master Index, i.e. to sections of the Index to which the article is most relevant. For example, the exemplary article on atrial flutter is suitable for inclusion in the B-4.5b section of the Cardiovascular/Peripheral Vascular of the Index (see FIG. 5A) and also in the V-20.5 section of the Respiratory/Chest section of the Index (see FIG. 5B). Other codes may also be associated with the article, if appropriate, but no more than about 5 codes are assigned per article.

An expert then assigns the article to suitable specialty collections by, for example, noting the abbreviation for appropriate collections on a second copy of the TOC of the journal, adjacent to the article title. In the case of the exemplary atrial fibrillation article, suitable specialty collections could be, for example, cardiovascular (CV), internal medicine (IM), geriatrics (G), etc. There is no limit to the number of specialty collections to which the article may be assigned. The primary assignment is likely to be to the specialty associated with which the core journal from which the article was taken. However, assignment to e.g. the geriatrics specialty collection may also be deemed appropriate, and *The American Journal of Medicine* (in the group of cardiology core journals) would thus become a secondary source journal for geriatrics.

The article and its associated code(s) is then placed in the specialty collections to which it has been assigned. The exemplary article will be placed, for example, in the cardiology and geriatrics specialty collections. The associated codes, B-4.5b and V-20.5, migrate with the article and are merged with the index for the specialty collection. For example, with respect to the cardiology specialty collection index, if there are already articles in the index with code "B-4.5b", then the new atrial fibrillation article is added to the "B-4.5b" section of the index. If no other article with code "B-4.5b" has ever been introduced into the cardiology specialty collection index, then a new entry "B-4.5b" is automatically inserted into the index. The same it true for inclusion of the article in the geriatrics specialty collection: the article will be assigned to the "V-20.5" section of the geriatrics specialty index, unless it does not yet exist, in which case section "V-20.5" will be automatically created as a heading in the geriatrics specialty collection index.

Example 2

Use of the Database of the Present Invention in Comparison to PubMed

Due to the nature of the database of the present invention, the efficiency of the search engine is far superior to that of other presently known search engines such as PubMed. Table 1 describes the search efficiency using the customized database of the present invention, compared to a National Library of Medicine (NLM) based search.

TABLE 1

Search efficiency

| Characteristic | Customized Database | NLM based |
| --- | --- | --- |
| Average search time | 2-3 minutes | 12-20 minutes |
| Number of index terms in thesaurus | 2,200 | 22,000 |
| Number of citations retrieved per search | 5 to 25 | 20 to 40,000 |
| Availability/lag time from publication | <1 week | 10 weeks |
| Retrieval relevancy or precision* | 96 to 100% | 40 to 60% |

*Retrieval relevancy or precision was determined by an expert reviewer.

As can be seen, use of the search engine, database and methods of the present invention results in the rapid retrieval of a manageable number (e.g. about 5 to about 20) of current, highly relevant documents that are highly relevant to the search topic, with few or no false positives.

While the invention has been described in terms of its preferred embodiments, those skilled in the art will recognize that the invention can be practiced with modification within the spirit and scope of the appended claims. Accordingly, the present invention should not be limited to the embodiments as described above, but should further include all modifications and equivalents thereof within the spirit and scope of the description provided herein.

I claim:

1. A method of sorting a plurality of documents to be accessed by a plurality of readers or groups of readers, said method comprising the steps of developing a list of interest areas represented by said plurality of readers, developing a hierarchical index of subject matter referred to in said plurality of documents, each entry in said hierarchical index having at least one of an index term and an associated code, assigning a limited number of index terms and associated codes of said hierarchical index to each document of said plurality of documents, assigning a limited number of contexts or potential uses for which a document of said plurality of documents is particularly suited and associated codes to selected ones of said plurality of documents, assigning at least one of said interest areas to each document of said plurality of documents, and assembling a plurality of hierarchical indices of subject matter for respective interest areas from index terms and associated codes assigned to documents in each of said interest areas, and sorting respective documents of said plurality of documents in accordance with a respective one of said plurality of hierarchical indices for respective interest areas and said contexts or potential uses.

2. The method of claim 1, wherein said method is employed to construct a database.

3. The method of claim 1, wherein said interest areas are in the field of health care.

4. The method of claim 3, wherein said interest areas are recognized medical specialties.

5. The method of claim 1, where from 1-5 index terms and associated codes are assigned per document.

6. The method as recited in claim 1, wherein codes are applied to entries in said hierarchical index, said codes relating to subject matter of respective entries.

7. The method as recited in claim 1, including the further step of designating a document as a key article.

8. The method of claim 7, including the further step of providing text related to a document.

9. The method of claim 8, including the further step of providing continuing professional education material related to said document.

10. The method as recited in claim 1, including the further step of designating a document for access by a particular group of users of said database.

11. The method of claim 10 including the further step of providing text related to a document.

12. A method of sorting a plurality of documents to be accessed by a plurality of readers or groups of readers, said method comprising the steps of developing a list of interest areas represented by said plurality of readers, developing a hierarchical index of subject matter referred to in said plurality of documents, each entry in said hierarchical index having at least one of an index term and an associated code, assigning a limited number of index terms and associated codes of said hierarchical index to each document of said plurality of documents, assigning at least one of said interest areas to each document of said plurality of documents, and assembling a plurality of hierarchical indices of subject matter for respective interest areas from index terms and associated codes assigned to documents in each of said interest areas, sorting respective documents of said plurality of documents in accordance with a respective one of said plurality of hierarchical indices for respective interest areas, and at least one of browsing said index terms and selecting an index term at a less refined hierarchical level as a context for another index term for purposes of a search, and sorting search results based on an index term and an interest area in accordance with components of said documents.

13. The method of claim 12, wherein said method is employed to construct a database.

14. The method of claim 12, wherein said interest areas are in the field of health care.

15. The method of claim 14, wherein said interest areas are recognized medical specialties.

16. The method of claim 12, where from 1-5 index terms and associated codes are assigned per document.

17. The method as recited in claim 12, wherein codes are applied to entries in said hierarchical index, said codes relating to subject matter of respective entries.

18. The method as recited in claim 12, including the further step of designating a document as a key article.

19. The method of claim 18, including the further step of providing text related to a document.

20. The method of claim 19, including the further step of providing continuing professional education material related to said document.

21. The method as recited in claim 12, including the further step of designating a document for access by a particular group of users of said database.

22. The method of claim 21 including the further step of providing text related to a document.

23. A method of searching a specialty oriented document database or index created from a master index of a subject matter area by
  assigning one or more specialties to each document,
  assigning one or more terms or codes from said master index to each document,
  assigning a context or potential use for which the a document of said plurality of documents is particularly suited to selected ones of said documents,
  assembling a database comprising said documents having a selected specialty in accordance with said terms or codes, said method comprising steps of
  arranging said terms or codes hierarchically or alphanumerically,
  browsing said terms or codes, and
  accessing said database in accordance with at least one of said terms or codes and at least one of
  a said context or use for which the a document of said plurality of documents is particularly suited,
  an index term selected by browsing said index terms at a hierarchically less refined level to specify a context of another specified index term, and
  one or more components of respective ones of said documents.

24. The method of claim 23, further comprising steps of assigning key words to related terms or codes, respectively, browsing said keywords, and
  accessing said terms or code using said key words.

25. The method of claim 24, wherein said documents are limited in number and including the further step of
  linking said database to a plenary database in accordance with said terms or codes.

26. The method of claim 23, wherein said documents are limited in number and including the further step of
  linking said database to a plenary database in accordance with said terms or codes.

27. A method of searching as recited in claim 23 including the further step of browsing a list of index terms appearing at a predetermined level of a hierarchical arrangement of said index terms.

* * * * *